United States Patent
Skaff et al.

(10) Patent No.: US 11,774,842 B2
(45) Date of Patent: Oct. 3, 2023

(54) SYSTEMS AND METHODS FOR IMAGE CAPTURE AND SHELF CONTENT DETECTION

(71) Applicant: BOSSA NOVA ROBOTICS IP, INC., San Francisco, CA (US)

(72) Inventors: Sarjoun Skaff, Boca Raton, FL (US); Matthew Brekken, Thornton, CO (US); Alexander Fink, Austin, TX (US); Garrick Kremesec, San Francisco, CA (US); Brendan Mcleod, Londonderry, NH (US); Christian Carlberg, San Luis Obispo, CA (US)

(73) Assignee: BOSSA NOVA ROBOTICS IP, INC., San Francisco, CA (US)

( * ) Notice: Subject to any disclaimer, the term of this patent is extended or adjusted under 35 U.S.C. 154(b) by 0 days.

(21) Appl. No.: 17/633,841

(22) PCT Filed: Aug. 14, 2020

(86) PCT No.: PCT/US2020/046408
§ 371 (c)(1),
(2) Date: Feb. 8, 2022

(87) PCT Pub. No.: WO2021/034681
PCT Pub. Date: Feb. 25, 2021

(65) Prior Publication Data
US 2022/0303445 A1   Sep. 22, 2022

Related U.S. Application Data

(60) Provisional application No. 62/888,265, filed on Aug. 16, 2019.

(51) Int. Cl.
*G03B 30/00* (2021.01)
*H04N 23/72* (2023.01)
(Continued)

(52) U.S. Cl.
CPC .......... *G03B 30/00* (2021.01); *G06V 10/141* (2022.01); *G06V 20/52* (2022.01); *H04N 23/54* (2023.01);
(Continued)

(58) Field of Classification Search
CPC ...... G03B 17/561; G03B 30/00; G03B 37/02; G06Q 10/087; G06V 10/141; G06V 10/16;
(Continued)

(56) References Cited

U.S. PATENT DOCUMENTS

| 8,189,855 B2 | 5/2012 | Opalach et al. |
| D675,656 S | 2/2013 | Sutherland et al. |

(Continued)

OTHER PUBLICATIONS

PCT/US2020/046408 International Search Report and Written Opinion dated Oct. 28, 2020.

*Primary Examiner* — Amy R Hsu
(74) *Attorney, Agent, or Firm* — Ambrose, Mills & Lazarow, PLLC

(57) ABSTRACT

An image capture system for tracking target objects includes a movable base that supports one or more image capture modules, each of the image capture modules including a camera module, a first light module and a second light module. The camera module is mounted on a first plane of a mount bracket, the first light module is mounted on a second plane of the mounting bracket, and a second light module is mounted on a third plane of the mounting bracket. The first and second planes define a first angle, the first and third planes define a second angle, and the second angle is larger than the first angle. An output of the first light module and a light output of the second light module is selected based on an operating condition of the camera module.

20 Claims, 23 Drawing Sheets

(51) Int. Cl.
*H04N 23/54* (2023.01)
*H04N 23/56* (2023.01)
*G06V 10/141* (2022.01)
*G06V 20/52* (2022.01)
*G06V 10/10* (2022.01)

(52) U.S. Cl.
CPC ............ *H04N 23/56* (2023.01); *H04N 23/72* (2023.01); *G06V 10/16* (2022.01)

(58) Field of Classification Search
CPC ........ G06V 20/52; H04N 23/50; H04N 23/54; H04N 23/56; H04N 23/57; H04N 23/698; H04N 23/72
See application file for complete search history.

(56) References Cited

U.S. PATENT DOCUMENTS

| | | | |
|---|---|---|---|
| 8,508,527 | B2 | 8/2013 | Jeong et al. |
| 9,015,072 | B2 | 4/2015 | Wu et al. |
| D735,258 | S | 7/2015 | Jang et al. |
| 9,076,042 | B2 | 7/2015 | Saptharishi et al. |
| 9,097,800 | B1 | 8/2015 | Zhu |
| 9,174,342 | B2 | 11/2015 | Pinter et al. |
| 9,373,057 | B1 | 6/2016 | Erhan et al. |
| 9,776,327 | B2 | 10/2017 | Pinter et al. |
| D811,458 | S | 2/2018 | Wang et al. |
| D817,375 | S | 5/2018 | Deyle et al. |
| 9,984,451 | B2 | 5/2018 | Gormish et al. |
| D819,712 | S | 6/2018 | Gee et al. |
| D822,736 | S | 7/2018 | Kato et al. |
| D841,067 | S | 2/2019 | Camporesi et al. |
| 10,200,623 | B1 * | 2/2019 | Baldwin ................ H04N 23/63 |
| D843,428 | S | 3/2019 | Gee |
| D849,813 | S | 5/2019 | Sutherland et al. |
| D854,595 | S | 7/2019 | Gayne et al. |
| D855,673 | S | 8/2019 | Sutherland et al. |
| D856,389 | S | 8/2019 | Gayne et al. |
| D857,073 | S | 8/2019 | Gayne et al. |
| D859,485 | S | 9/2019 | Sutherland et al. |
| D872,788 | S | 1/2020 | Sutherland et al. |
| 10,565,548 | B2 | 2/2020 | Skaff et al. |
| D877,786 | S | 3/2020 | Gayne et al. |
| D884,043 | S | 5/2020 | Song |
| D908,151 | S | 1/2021 | Song |
| D913,349 | S | 3/2021 | Yao et al. |
| D915,486 | S | 4/2021 | Gidwell |
| D917,591 | S | 4/2021 | Xiao |
| D918,281 | S | 5/2021 | Kong et al. |
| D918,978 | S | 5/2021 | Li |
| D919,687 | S | 5/2021 | Song |
| D920,410 | S | 5/2021 | Chen et al. |
| D920,411 | S | 5/2021 | Zheng et al. |
| D921,080 | S | 6/2021 | Hernandez et al. |
| D921,082 | S | 6/2021 | Hernandez et al. |
| D921,083 | S | 6/2021 | Hernandez et al. |
| D924,956 | S | 7/2021 | Pajevic et al. |
| 2008/0077511 | A1 | 3/2008 | Zimmerman |
| 2009/0059270 | A1 | 3/2009 | Opalach et al. |
| 2009/0060259 | A1 | 3/2009 | Goncalves |
| 2009/0063307 | A1 | 3/2009 | Groenovelt et al. |
| 2009/0094140 | A1 | 4/2009 | Kwan |
| 2009/0192921 | A1 | 7/2009 | Hicks |
| 2010/0065634 | A1 | 3/2010 | Nakamura |
| 2012/0323620 | A1 | 12/2012 | Hofman et al. |
| 2013/0182114 | A1 | 7/2013 | Zhang et al. |
| 2014/0003655 | A1 | 1/2014 | Gopalakrishnan et al. |
| 2014/0003727 | A1 | 1/2014 | Lortz et al. |
| 2015/0052027 | A1 | 2/2015 | Pavani et al. |
| 2015/0073589 | A1 | 3/2015 | Khodl et al. |
| 2015/0117788 | A1 | 4/2015 | Patel et al. |
| 2015/0139536 | A1 | 5/2015 | Jin et al. |
| 2015/0162048 | A1 | 6/2015 | Hirata et al. |
| 2015/0193909 | A1 | 7/2015 | Maayan et al. |
| 2015/0248592 | A1 | 9/2015 | Wang et al. |
| 2015/0363758 | A1 | 12/2015 | Wu et al. |
| 2016/0027159 | A1 | 1/2016 | Amirghodsi et al. |
| 2016/0119540 | A1 | 4/2016 | Wu |
| 2016/0171429 | A1 | 6/2016 | Schwartz |
| 2016/0180533 | A1 | 6/2016 | Pavani et al. |
| 2016/0309082 | A1 | 10/2016 | Maayan et al. |
| 2017/0032311 | A1 | 2/2017 | Rizzolo et al. |
| 2017/0153107 | A1 * | 6/2017 | Beer ..................... H05B 47/11 |
| 2017/0178310 | A1 | 6/2017 | Gormish et al. |
| 2017/0178372 | A1 | 6/2017 | Gormish et al. |
| 2017/0193324 | A1 | 7/2017 | Chen et al. |
| 2017/0193434 | A1 | 7/2017 | Shah et al. |
| 2017/0261993 | A1 | 9/2017 | Venable et al. |
| 2017/0282731 | A1 | 10/2017 | Kwa et al. |
| 2017/0286805 | A1 | 10/2017 | Yu et al. |
| 2017/0286901 | A1 | 10/2017 | Skaff et al. |
| 2017/0337506 | A1 | 11/2017 | Wise et al. |
| 2017/0344190 | A1 * | 11/2017 | Wang ................... H04N 9/3179 |
| 2018/0005176 | A1 | 1/2018 | Williams et al. |
| 2018/0025196 | A1 | 1/2018 | Todeschini et al. |
| 2018/0106936 | A1 * | 4/2018 | Heshmat Dehkordi ..................... G01S 17/894 |
| 2018/0108120 | A1 | 4/2018 | Venable et al. |
| 2018/0108134 | A1 | 4/2018 | Venable et al. |
| 2018/0218494 | A1 | 8/2018 | Chaubard et al. |
| 2018/0260772 | A1 | 9/2018 | Chaubard et al. |
| 2018/0293543 | A1 | 10/2018 | Tiwari |
| 2019/0019293 | A1 | 1/2019 | Woodroffe |
| 2019/0034864 | A1 | 1/2019 | Skaff et al. |
| 2019/0057588 | A1 | 2/2019 | Savvides et al. |
| 2019/0073554 | A1 | 3/2019 | Rzeszutek |
| 2019/0156275 | A1 | 5/2019 | Fisher et al. |
| 2019/0187464 | A1 * | 6/2019 | Qin ....................... H04N 23/56 |
| 2019/0215420 | A1 | 7/2019 | Kaneko et al. |
| 2019/0246025 | A1 | 8/2019 | Duran et al. |
| 2021/0115781 | A1 * | 4/2021 | Stark ..................... H04N 23/90 |
| 2021/0178576 | A1 | 6/2021 | Murphy et al. |
| 2021/0201020 | A1 * | 7/2021 | Willis .................... G06V 40/19 |

* cited by examiner

SYSTEMS AND METHODS FOR IMAGE CAPTURE AND SHELF CONTENT DETECTION

CROSS-REFERENCE TO RELATED APPLICATIONS

This application is a U.S. national stage filing under 35 U.S.C. § 371 of International Application No. PCT/US2020/046408, entitled "Systems and Methods for Image Capture and Shelf Content Detection," filed Aug. 14, 2020, which claims benefit of priority to U.S. Provisional Application No. 62/888,265, entitled "Systems and Methods for Image Capture and Shelf Content Detection," filed Aug. 16, 2019, each of which is incorporated herein by reference in its entirety.

BACKGROUND

The embodiments described herein relate to a camera module with a sensor unit and a lighting unit. More particularly, the embodiments described herein relate to devices for dynamically adjusting light output based on at least a focus depth between a camera and a target object to promote even illumination, reduce glare, and improve image quality.

Retail stores, warehouses, and storage facilities can have thousands of distinct products that are often sold, removed, added, or repositioned. Even with frequent restocking schedules, products assumed to be in stock may actually be out of stock, decreasing both sales and customer satisfaction. Point of sales data can be used to roughly estimate product availability, but does not help with identifying misplaced, stolen, or damaged products, all of which can reduce product availability. However, manually monitoring product inventory and tracking product position is expensive and time consuming.

One solution for tracking product inventory relies on machine vision technology. Machine vision can be used to assist in shelf space monitoring. For example, large numbers of fixed position cameras can be used throughout a store to monitor aisles, with large gaps in shelf space being flagged. Alternatively, a smaller number of movable cameras can be used to scan a store aisle. Even with such systems, human intervention is usually required to determine product identification number, product count, and to search for misplaced product inventory.

Optical systems with fixed-focus lens systems are limited by a fixed and predetermined depth of field (i.e. the range of distances from the camera within which objects appear in focus). This depth of field is typically designed to focus images on the shelf edge to read the content of shelf labels such as price tags, including price, product names and codes, and barcodes with maximum clarity. Objects that are outside the depth of field are out of focus, which creates a problem with reading the content of shelf labels placed on short pegs, or the content of product packaging when a product is pushed back from the shelf edge towards the back of the shelf.

One solution to depth of field limitations has been the use of auto-focus cameras, i.e., the combination of an auto-focus algorithm and a motorized lens capable of changing its focus depth on demand. This solution works well when the algorithm can determine the correct focus distance for each frame, but it fails in scenarios where all depths may be of equal importance. This limits use of autofocus cameras when product labels or barcodes can be positioned at the front or the back of a supermarket shelf.

Another possible solution for depth of field limitations is focus stacking, where the same frame is captured multiple times with the camera set to different focus depths, and the results are combined using a complex algorithm into a single frame where each object is selected from the source frame in which it is in the best focus. However, this method can be a) computationally intensive, b) require the camera to be stationary to capture the exact same field of view multiple times, and c) can result in distortions or glare such that the algorithm does not know where a specific object begins or ends. If the object is a barcode, such distortions may render the barcodes unreadable.

Thus, a need exists for improved cameras and sensors to capture sharp and clearly focused images of a target object even if the cameras and sensors are not stationary relative to the target object.

SUMMARY

A low cost, accurate, and scalable camera system for product or other inventory monitoring can include a movable base. Multiple cameras supported by the movable base are directable toward shelves or other systems for holding products or inventory. A processing module is connected to the multiple cameras and able to construct from the camera derived images an updateable map of product or inventory position. Because it can be updated in real or near real time, this map is known as a "realogram" to distinguish from conventional "planograms" that take the form of 3D models, cartoons, diagrams or lists that show how and where specific retail products and signage should be placed on shelves or displays. Realograms can be locally stored with a data storage module connected to the processing module. A communication module can be connected to the processing module to transfer realogram data to remote locations, including store servers or other supported camera systems, and additionally receive inventory information including planograms to aid in realogram construction. In addition to realogram mapping, this system can be used detect out of stock products, estimate depleted products, estimate amount of products including in stacked piles, estimate products' heights, lengths and widths, build 3D models of products, determine products' positions and orientations, determine whether one or more products are in disorganized on-shelf presentation that requires corrective action such as facing or zoning operations, estimate freshness of products such as produce, estimate quality of products including packaging integrity, locate products, including at home locations, secondary locations, top stock, bottom stock, and in the backroom, detect a misplaced product event (also known as a plug), identify misplaced products, estimate or count the number of product facings, compare the number of product facings to the planogram, estimate label locations, detect label type, read label content, including product name, barcode, UPC code and pricing, detect missing labels, compare label locations to the planogram, compare product locations to the planogram, measure shelf height, shelf depth, shelf width and section width, recognize signage, detect promotional material, including displays, signage, and features and measure their bring up and down times, detect and recognize seasonal and promotional products and displays such as product islands and features, capture images of individual products and groups of products and fixtures such as entire aisles, shelf sections, specific products on an aisle, and product displays and islands, capture 360-degree and spherical views of the environment to be visualized in a virtual tour application allowing for virtual walkthroughs, capture 3D images of the environment to be viewed in augmented or virtual reality, capture environmental conditions including ambient light levels, capture information about the environment including measuring space compliance with disability and safety standards and determining if light bulbs are off, provide a real-time video feed of the space to remote monitors, provide on-demand images and videos of specific locations, including in live or scheduled settings, and build a library of product images.

In one embodiment, the movable base can be a manually pushed or guidable cart. Alternatively, in some embodiments, the movable base can be a tele-operated robot or an autonomous robot capable of guiding itself through a store or warehouse. Depending on the size of the store or warehouse, multiple autonomous robots can be used. Aisles can be regularly inspected to create realograms, with aisles having high product movement being inspected more often.

To simplify image processing and provide accurate results, the multiple cameras are typically positioned a set distance from the shelves during the inspection process. The shelves can be lit with ambient lighting, or in some embodiments, by an array of LED or other directable light sources positioned near the cameras. The multiple cameras can be linearly mounted in vertical, horizontal, or other suitable orientation on a camera support. In some embodiments, to reduce costs, multiple cameras are fixedly mounted on a camera support. Such cameras and light sources can be arranged to point upward, downward, forward, backward, or level with respect to the camera support and the shelves. This advantageously permits a reduction in glare from products and shelving fixtures having highly reflective surfaces by orienting lights sources and cameras such that cameras are out of the way of reflected light paths. In addition, multiple cameras with overlapping fields of view can result in at least one image with little or no glare.

In other embodiments, the cameras can include one or more movable cameras, zoom cameras, focusable cameras, wide-field cameras, infrared cameras, or other specialty cameras to aid in product identification or image construction, reduce power consumption and motion blur, and relax the requirement of positioning the cameras at a set distance from shelves. For example, a wide-field camera can be used to create a template into which data from higher resolution cameras with a narrow field of view are mapped. As another example, a tilt controllable, high resolution camera positioned on the camera support can be used to detect shelf labels and their content, including the price and product name, and decode their barcodes.

In another embodiment, an inventory monitoring method includes the steps of allowing an autonomous robot to move along an aisle that is lined with shelves or other fixtures capable of holding inventory or products, with the autonomous robot acting as a movable base for multiple cameras. Multiple cameras are directed toward inventory on the shelf lined aisle, with data derived at least in part from these cameras being used to construct a realogram of inventory using a processing module contained in the autonomous robot. Realogram data created by the processing module can be transferred to remote locations using a communication module, and inventory information received via the communication module can be used to aid in realogram construction.

In yet another embodiment, an inventory monitoring method, includes the steps of allowing an autonomous robot to move along a shelf lined aisle holding inventory, with the autonomous robot acting as a movable base for multiple cameras. The autonomous robot can maintain a substantially constant distance from the shelf lined aisle holding inventory while moving in a forward or reverse direction. Using the multiple cameras directed toward inventory on the shelf lined aisle, at least part of a realogram of inventory positioned along a shelf lined aisle holding inventory can be constructed. Typically, the realogram is created and updated with a locally sited data storage and a processing module contained in the autonomous robot. To ensure complete or near complete camera coverage of shelf lined aisles, the autonomous robot can pause, reverse, or mark for further multiple camera inspection if realogram creation for a portion of the shelf lined aisle is incomplete.

In still other embodiments, common issues associated with taking pictures from a moving base can be reduced by orientation of one or more of the multiple cameras in such a way as to take advantage of the rolling shutter effects and the direction of travel of the autonomous robot. In effect, aligning a camera in such a way as to take advantage of the "rasterized" delay of the rolling shutter reduces the artifacts (elongation/shortening) that could occur while the robot is traveling in its path.

In some embodiments, an apparatus includes a mounting bracket, a camera module, a first light module, and a second light module. The mounting bracket includes a first mounting portion, a second mounting portion and a third mounting portion. The first mounting portion defines a first plane, the second mounting portion defines a second plane, and the third mounting portion defines a third plane. The second plane and the first plane intersect to define a first angle, the third plane and the first plane intersect to define a second angle, the second angle is greater than the first angle.

Other robots, image capturing systems, and/or camera modules will be or become apparent to one with skill in the art upon review of the following drawings and detailed description. It is intended that all such additional robots, image capturing systems, camera modules, and/or methods included within this description be within the scope of this disclosure.

DETAILED DESCRIPTION

Figure 1:
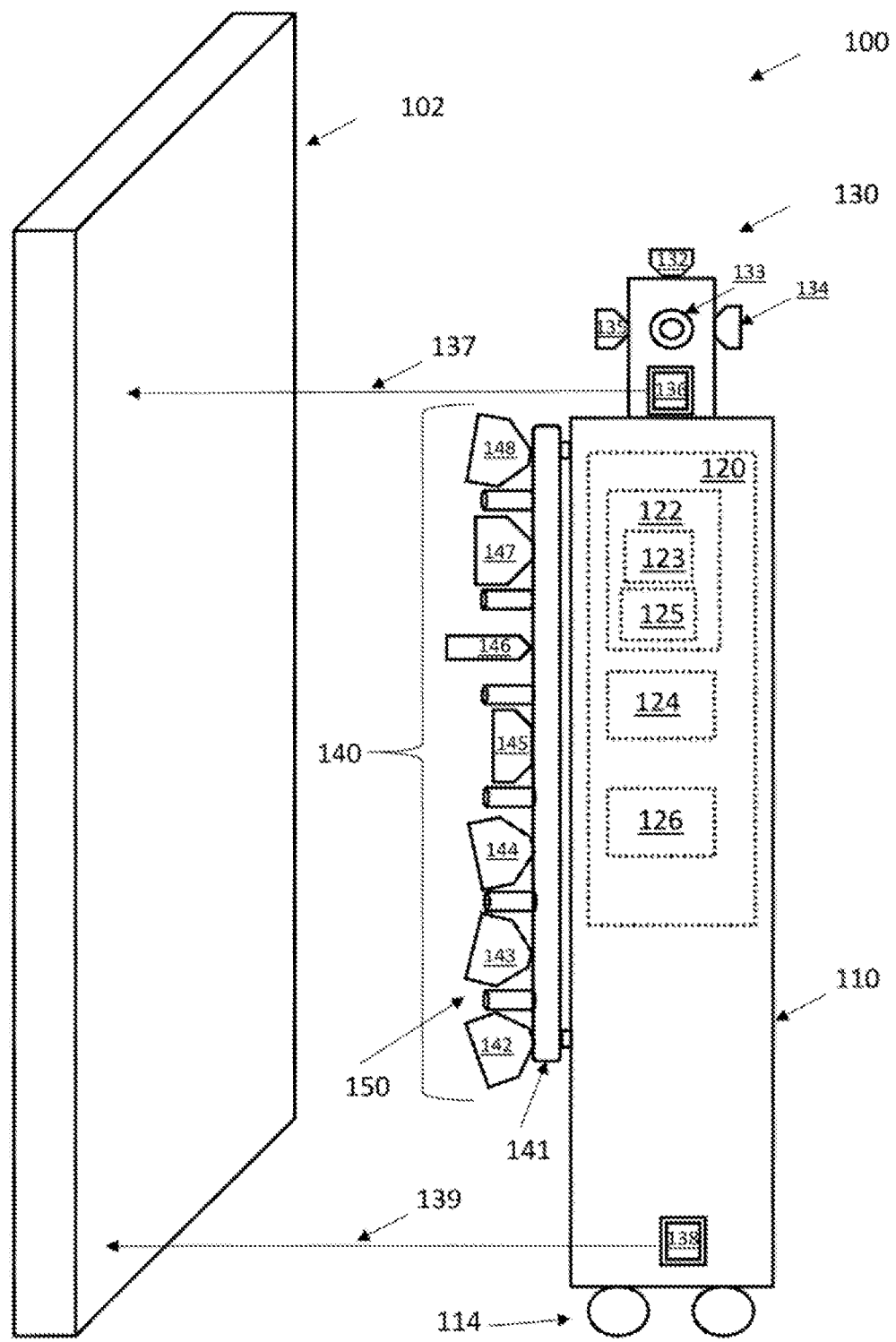
FIG. 1 is a side view of a camera system mounted on a movable base to track product changes in aisle shelves or other suitable targets in accordance with an embodiment.

Image capture systems and methods for dynamically adjusting light output based on at least a focal distance between a camera and a target object to promote even illumination, reduce glare, and improve image quality are described herein.

In some embodiments, an apparatus includes a mounting bracket, a camera module, a first light module, and a second light module. The mounting bracket includes a first mounting portion, a second mounting portion and a third mounting portion, the first mounting portion defining a first plane. The camera module is secured to the first mounting portion, the first light module is secured to the second mounting portion, and the second light module is secured to the third mounting portion. The second mounting portion defines a second plane. The second plane and the first plane intersect to define a first angle. The third mounting portion defines a third plane. The third plane and the first plane interest to define a second angle.

In some embodiments, the second angle is greater than the first angle. In some embodiments, the first angle is between about 0.5 and 5 degrees, and the second angle is between about 3 and 20 degrees. In some embodiments, the first angle is between 1 to 1.5 degrees and the second angle is between about 8 to 12 degrees. In some embodiments, a center of the camera module is spaced approximately 25 to 150 mm from the center of the first light module along the first plane.

In some embodiments, the camera module includes a control board. The control board is configured to control the first light module to emit a first light beam at a first light intensity during a time period. The control board is also configured to control the second light module to emit a second light beam at a second light intensity during the time period. The second light intensity is independent from the first light intensity.

In some embodiments, the camera module includes a control board. The control board is configured to control the first light module to emit a first light beam at a first light intensity during a first time period when the camera module is set to capture a first image at a first focus depth. The control board is also configured to control the second light module to emit a second light beam at a second light intensity during the first time period. The control board is configured to control the first light module to emit a third light beam at a third light intensity during a second time period when the camera module is set to capture a second image at a second focus depth. The second focus depth is different from the first focus depth. The control board is configured to control the second light module to emit a fourth light beam at a fourth light intensity during the second time period. The second light intensity is greater than the first light intensity, and the fourth light intensity is less than the third light intensity.

In some embodiments an image capture system includes a movable base, a chassis, and an image capture module. The image capture module includes a mounting bracket, a camera module, a first light module, and a second light module. The movable base is configured to move on a surface. The chassis is supported by the movable base. The mounting bracket is mounted to the chassis. The mounting bracket includes a first mounting portion, a second mounting portion and a third mounting portion. The camera module is secured to the first mounting portion. The first light module is secured to the second mounting portion. The second light module is secured to the third mounting portion. The first mounting portion defines a first plane. The second mounting portion defines a second plane, the second plane and the first plane intersecting to define a first angle. The third mounting portion defining a third plane, the third plane and the first plane intersecting to define a second angle. The second angle is greater than the first angle. In some embodiments, the surface defines a surface plane, and the first plane of the mounting bracket is perpendicular with the surface plane. In some embodiments, the surface defines a surface plane, and the surface plane and an optical axis of the camera module define a tilt angle of between 5 and 75 degrees.

In some embodiments, the camera module includes a control board. The control board is configured to control the first light module to emit a first light beam at a first light intensity during a time period. The control board is configured to control the second light module to emit a second light beam at a second light intensity during the time period. The second light intensity is independent from the first light intensity.

In some embodiments, the image capture module is a first image capture module, the camera module is a first camera module, and the mounting bracket is a first mounting bracket. The image capture system further includes a second image capture module. The second image capture module includes a second mounting bracket, a second camera module, a third light module, and a fourth light module. The first image capture module is mounted to the chassis at a first height relative to the surface. The second image capture module is mounted to the chassis at a second height relative to the surface, the second height being different from the first height.

In some embodiments, the second mounting bracket includes a fourth mounting portion, a fifth mounting portion, and a sixth mounting portion. The second camera module is secured to the fourth mounting portion, the third light module is secured to the fifth mounting portion, and the fourth light module is secured to the sixth mounting portion. The fourth mounting portion defines a fourth plane. The fifth mounting portion defines a fifth plane, the fifth plane and the fourth plane intersecting to define a third angle. The sixth mounting portion defining a sixth plane, the sixth plane and the fourth plane intersecting to define a fourth angle. The fourth angle is greater than the third angle.

In some embodiments, the surface defines a surface plane. The first plane of the first mounting bracket is perpendicular with the surface plane. The fourth plane of the second mounting bracket is non-perpendicular with the surface plane. A first optical axis of the first camera module and the surface place define a tilt angle of 0 degrees. A second optical axis of the second camera module and the surface plane define a second tilt angle between 5 and 75 degrees.

In some embodiments, a method of adjusting light intensity in an image capture system including a mounting bracket, a camera module, a first light module, and a second light module, the method includes adjusting a camera of the camera module to a focus depth. The camera module is mounted to a first mounting portion of the mounting bracket, the first mounting portion defining a first plane. The method includes setting a first intensity level of the first light module to emit a first light beam at a first light intensity during a time period when the camera is set to capture an image at the focus depth. The first light module is mounted to a second mounting portion of the mounting bracket, the second mounting portion defining a second plane. The second plane intersects with the first plane to define a first angle. The method includes setting a second intensity level of the second light module to emit a second light beam at a second light intensity during the time period when the camera is set to capture the image at the focal depth. The second light module is mounted to a third mounting portion of the mounting bracket, the third mounting portion defining a third plane. The third plane intersects with the first plane to define a second angle. The second light intensity is independent from the first light intensity, and the second angle is greater than the first angle.

In some embodiments, the focus depth is a first focus depth, the image is a first image, and the time period is a first time period. The method further includes adjusting the camera of the camera module to a second focal depth. The method includes setting a third intensity level of the first light module to emit a third light beam at a third light intensity during a second time period when the camera is set to capture a second image at the second focal depth. The method includes setting a fourth intensity level of the second light module to emit a fourth light beam at a fourth light intensity during the second time period. The second focus depth is longer than the first focus depth. The fourth light intensity is less than the second light intensity, and the fourth light intensity is less than the third light intensity.

In some embodiments, a method of capturing an image of a target object using an image capture system, the image capture system including a camera module, a first light module, and a second light module, the method includes determining a focal distance of the target object. The method includes sending a first signal to the first light module to emit a first light beam to at least a first portion of the target object at a first light intensity, and the first light intensity is associated with the focal distance. The method includes sending a second signal to the second light module to emit a second light beam at least a second portion of the target object at a second light intensity. The second light intensity is different from the first light intensity, and the second light intensity is associated with the focal distance. The method includes capturing, via the camera module, the image of the target object during a time period when the target object is illuminated by the first light module and the second light module. In some embodiments, the first portion of the target object overlaps with the second portion of the target object. In some embodiments, the camera module, the first light module, and the second light module are each coupled to a mounting bracket.

The term "about" when used in connection with a referenced numeric indication means the referenced numeric indication plus or minus up to 10% of that referenced numeric indication. For example, "about 100" means from 90 to 110.

In a similar manner, term "substantially" when used in connection with, for example, a geometric relationship, a numerical value, and/or a range is intended to convey that the geometric relationship (or the structures described thereby), the number, and/or the range so defined is nominally the recited geometric relationship, number, and/or range. For example, two structures described herein as being "substantially parallel" is intended to convey that, although a parallel geometric relationship is desirable, some non-parallelism can occur in a "substantially parallel" arrangement. By way of another example, a structure defining a distance that is "substantially 50 mm apart" is intended to convey that, while the recited distance or spacing is desirable, some tolerances can occur when the volume is "substantially" the recited volume (e.g., 50 mm). Such tolerances can result from manufacturing tolerances, measurement tolerances, and/or other practical considerations (such as, for example, minute imperfections, age of a structure so defined, a pressure or a force exerted within a system, and/or the like). As described above, a suitable tolerance can be, for example, of ±10% of the stated geometric construction, numerical value, and/or range.

Further, specific words chosen to describe one or more embodiments and optional elements or features are not intended to limit the invention. For example, spatially relative terms—such as "beneath", "below", "lower", "above", "upper", "proximal", "distal", and the like—may be used to describe the relationship of one element or feature to another element or feature as illustrated in the figures. Unless explicitly stated otherwise, these spatially relative terms are intended to encompass different positions (i.e., translational placements) and orientations (i.e., rotational placements) of a device or depicted objects beyond just the position and orientation shown in the figures. For example, if a device in the figures is turned over, elements described as "below" or "beneath" other elements or features would then be "above" or "over" the other elements or features. Thus, the term "below" can encompass both positions and orientations of above and below. A device may be otherwise oriented (e.g., rotated 90 degrees or at other orientations) and the spatially relative descriptors used herein interpreted accordingly.

FIG. 1 is an illustration of an inventory monitoring camera system 100 mounted on a movable base 110 (with drive wheels 114) to track product changes in aisle shelves or other targets 102. The movable base 110 is an autonomous robot having a navigation and object sensing suite 130 that is capable of independently navigating and moving throughout a building. The autonomous robot has multiple cameras 140 attached to movable base 110 by a vertically extending camera support 141. Lights 150 are positioned to direct light toward target 102. The object sensing suite includes forward 133, side 134 and 135, top 132 and rear (not shown) image and depth sensors to aid in object detection, localization, and navigation. Additional sensors such as range measurement units 136 and 138 (that measure respective depths 137 and 139) also form a part of the sensor suite that is useful for accurate distance determination. In certain embodiments, image sensors can be depth sensors that infer depth from stereo images, project an infrared mesh overlay that allows rough determination of object distance in an image, or that infer depth from the time of flight of light reflecting off the target. In other embodiments, simple cameras and various image processing algorithms for identifying object position and location can be used. For selected applications, ultrasonic sensors, radar systems, magnetometers or the like can be used to aid in navigation. In still other embodiments, sensors capable of detecting electromagnetic, light, or other location beacons can be useful for precise positioning of the autonomous robot.

As shown in FIG. 1, various representative camera types useful for constructing an updateable realogram are shown. As previously noted, a realogram can use camera derived images to produce an updateable map of product or inventory position. Alternatively, camera derived images can provide other useful inventory related information such as out of stocks, low stock, label location and content, shelves height and depth, section boundaries, or other operations or marketing/sales relevant data that can be extracted, utilized, and potentially delivered as a service to customers. Typically, one or more shelf units or fixtures (e.g., target 102) would be imaged by a diverse set of camera types, including downwardly (142 and 144) or upwardly (143 and 148) fixed focal length cameras that cover a defined field of view less than the whole of a target shelf unit; a wide field of view camera 145 to provide greater photographic coverage than the fixed focal length cameras; and a variable field of view, zoomable and focusable camera 146 to capture barcodes, product identification numbers, and shelf labels. Alternatively, a high resolution, tilt controllable camera can be used to identify shelf labels. These camera 140 derived images can be stitched together, with products in the images identified, and position determined.

To simplify image processing and provide accurate results, the multiple cameras are typically positioned a set distance from the shelves during the inspection process. The shelves can be illuminated with LED or other directable lights 150 positioned on or near the cameras. The multiple cameras can be linearly mounted in vertical, horizontal, or other suitable orientation on a camera support. In some embodiments, to reduce costs, multiple cameras are fixedly mounted on a camera support. Such cameras can be arranged to point upward, downward, or level with respect to the camera support and the shelves. This advantageously permits a reduction in glare from products having highly reflective surfaces, since multiple cameras pointed in slightly different directions can result in at least one image with little or no glare.

An electronic control unit 120 contains an autonomous robot sensing and navigation control module 124 that manages robot responses. Robot position localization may utilize external markers and fiducials, or rely solely on localization information provided by robot-mounted sensors (e.g., the object sensing suite 130). Sensors for position determination include previously noted imaging, optical, ultrasonic sonar, radar, LIDAR, Time of Flight, structured light, or other means of measuring distance between the robot and the environment, or incremental distance traveled by the mobile base, using techniques that include but are not limited to triangulation, visual flow, simultaneous localization and mapping, visual odometry and wheel odometry.

The electronic control unit 120 also provides image processing using a camera control and data processing module 122. Autonomous robot sensing and navigation control module 124 manages robot responses, and communication module 126 manages data input and output. The camera control and data processing module 122 can include a separate data storage module 123 (e.g. solid state hard drives) connected to a processing module 125. The communication module 126 is connected to the processing module 125 to transfer realogram data to remote locations, including store servers or other supported camera systems, and additionally receive inventory information to aid in realogram construction. In certain embodiments, images are primarily stored and processed within the autonomous robot. Advantageously, this reduces data transfer requirements, and permits operation even when local or cloud servers are not available.

Figure 2:
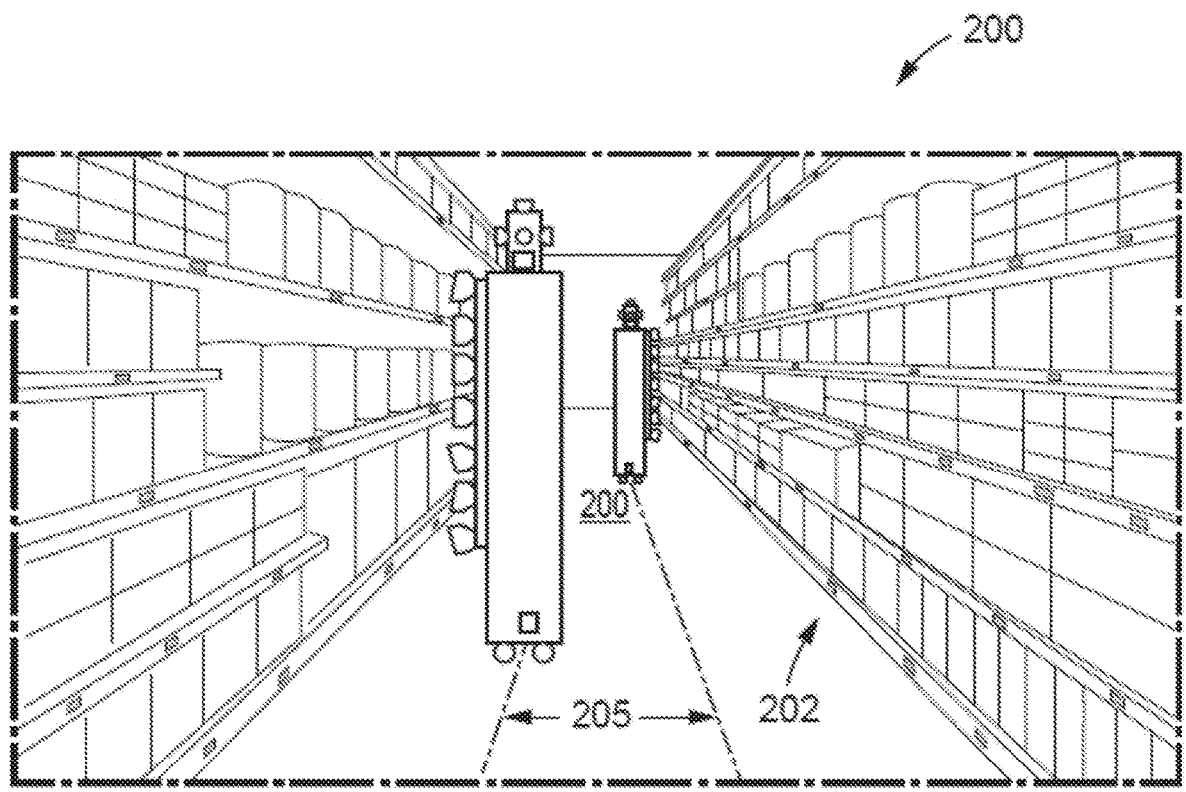
FIG. 2 is a graphical illustration of two autonomous robots inspecting opposite shelves in an aisle.

FIG. 2 is a graphical illustration 200 depicting two autonomous robots 230 and 232, inspecting opposite shelves 202 in an aisle. As shown, each robot follows path 205 along the length of an aisle, with multiple cameras capturing images of the shelves 202. In some embodiments, the robots 230 and 232 support at least one range finding sensor to measure distance between the multiple cameras and the shelves and products on shelves, with an accuracy of less than 5 centimeters, and with a typical accuracy range between about 5 centimeters and 1 millimeters. As will be appreciated, LIDAR or other range sensing instruments with similar accuracy can also be used in selected applications. Using absolute location sensors, relative distance measurements to the shelves, triangulation to a known landmark, conventional simultaneous localization and mapping (SLAM) methodologies, or relying on beacons positioned at known locations in a blueprint or a previously built map, the robots 230 and 232 can move along a path generally parallel to shelves 202. As the robots 230 and 232 move, vertically positioned cameras (e.g., a stack of cameras associated with each of the robots) are synchronized to simultaneously capture images of the shelves 202. In certain embodiments, a depth map of the shelves and products is created by measuring distances from the shelf cameras to the shelves and products over the length of the shelving unit using depth sensors and or laser ranging instrumentation. The depth map is registered onto the images captured by the shelf cameras, so the location of each pixel on target can be estimated in 3D. Using available information, consecutive images can be stitched together at the correct depth to create accurate panoramic images that spans an entire shelving unit. The consecutive images can be first stitched vertically among all the cameras, and then horizontally and incrementally stitched with each new consecutive set of vertical images as the robots 230 and 232 move along an aisle.

Figure 3:
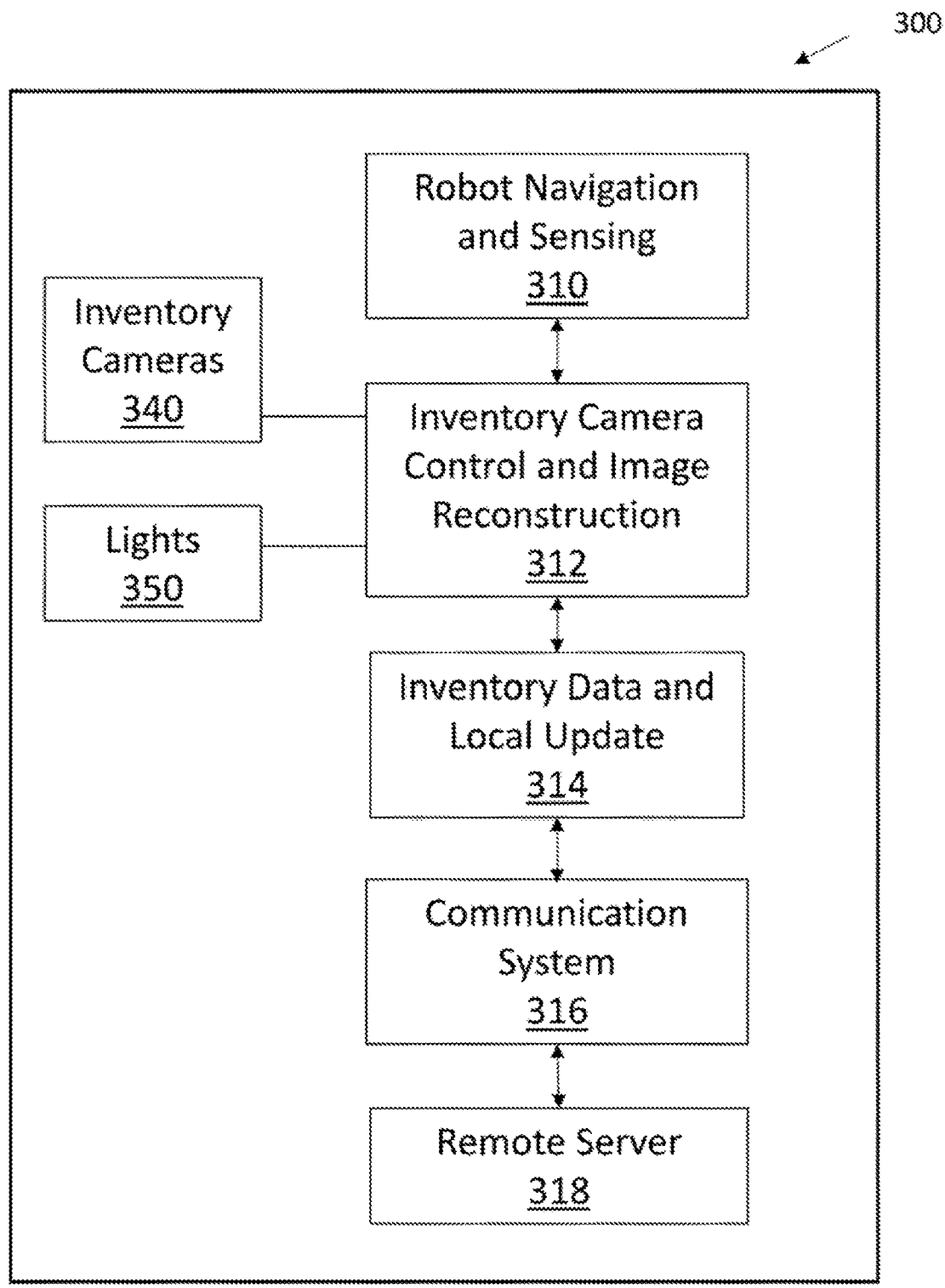
FIG. 3 is a block diagram illustrating various systems and electronic modules connected to inventory cameras in accordance with an embodiment.

FIG. 3 is an illustration of various systems and electronic modules 300 supported by an autonomous robot having robot navigation and sensing 310. Inventory cameras 340 are moved into a desired position with the aid of robot navigation and sensing module 310. Lights 350 are directed toward product inventory and inventory camera control and image reconstruction 312 takes a series of inventory photos (and optional depth measurements) that can be stitched together to help form or update a realogram. Realogram data is handled by an inventory data and local update module 314, which can transmit or receive realogram relevant information via a communication system 316. Data can be communicated to a server local to the store, or transmitted by suitable internet or networking devices to remote company servers or cloud accessible data sites.

The inventory cameras 340 can include one or more movable cameras, zoom cameras, focusable cameras, wide-field cameras, infrared cameras, ultraviolet cameras, or other specialty cameras to aid in product identification or image construction. For example, a wide-field camera can be used to create an image organizing template into which data from higher resolution cameras with a narrow field of view are mapped. As another example, a tilt controllable, high resolution camera positioned on the camera support roughly at a height of a shelf lip can be used to read shelf attached barcodes, identifying numbers, or labels. In certain embodiments, conventional RGB, CMOS, or CCD sensors can be used, alone or in combination with spectral filters that may include narrowband, wideband, or polarization filters. Embodiments can also include sensors capable of detecting infrared, ultraviolet, or other wavelengths to allow for hyperspectral image processing. This can allow, for example, monitoring and tracking of markers, labels or guides that are not visible to people, or using flashing light in the invisible spectrum that do not induce discomfort of health risk while reducing energy consumption and motion blur.

The lights 350 can be mounted along with, or separately from, the sensors, and can include monochromatic or near monochromatic light sources such as lasers, light emitting diodes (LEDs), or organic light emitting diodes (OLEDs). Broadband light sources may be provided by multiple LEDs of varying wavelength (including infrared or ultraviolet LEDs), halogen lamps or other suitable conventional light sources. Various spectral filters that may include narrowband, wideband, or polarization filters and light shields, lenses, mirrors, reflective surfaces, diffusers, concentrators, or other optics can provide wide light beams for area illumination or tightly focused beams for improved local illumination intensity.

According to some embodiments, both the cameras 340 and lights 350 can be movably mounted. For example, hinged, rail, electromagnetic piston, or other suitable actuating mechanisms used to rotate, elevate, depress, oscillate, or laterally or vertically reposition cameras or lights.

In still other embodiments, one or more of the cameras can be mounted in such a way as to take advantage of the rolling shutter effects and direction of travel of the autonomous robot. Aligning a camera in such a way as to take advantage of the "rasterized" delay of the rolling shutter can reduce artifacts (elongation/shortening) that can occur while the robot is traveling in its path.

Inventory data handled by the inventory data and local update module 314 can include but is not limited to an inventory database capable of storing data on a plurality of products, each product associated with a product type, product dimensions, a product 3D model, a product image and a current product shelf inventory count and number of facings. Realograms captured and created at different times can be stored, and data analysis used to improve estimates of product availability. In certain embodiments, frequency of realogram creation can be increased or reduced, and changes to robot navigation being determined.

The communication system 316 can include connections to both a wired or wireless connect subsystem for interaction with devices such as servers, desktop computers, laptops, tablets, or smartphones. Data and control signals can be received, generated, or transported between varieties of external data sources, including wireless networks, personal area networks, cellular networks, the Internet, or cloud mediated data sources. In addition, sources of local data (e.g. a hard drive, solid state drive, flash memory, or any other suitable memory, including dynamic memory, such as SRAM or DRAM) that can allow for local data storage of user-specified preferences or protocols. In one particular embodiment, multiple communication systems can be provided. For example, a direct Wi-Fi connection (802.11b/g/n) can be used as well as a separate 4G cellular connection.

A remote server 318 can include, but is not limited to servers, desktop computers, laptops, tablets, or smart phones. Remote server embodiments may also be implemented in cloud computing environments. Cloud computing may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Figure 4:
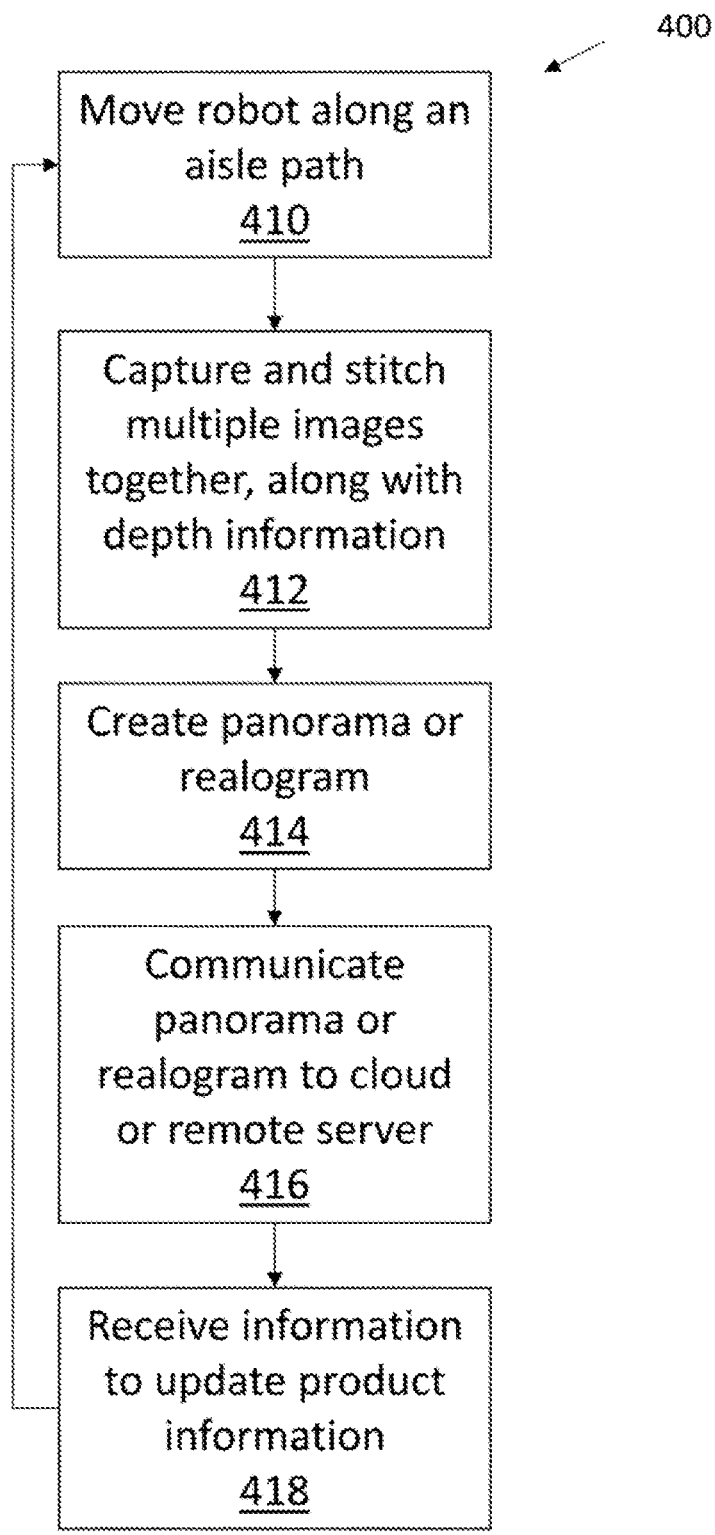
FIG. 4 is a flow chart of steps in accordance with one embodiment of operation.

FIG. 4 is a flow chart of realogram updating steps in one embodiment of operation. As shown in flow chart 400, a robot moves to an identified position and proceeds along an aisle path at a predetermined distance (step 410). If the path is blocked by people or objects, the robot can wait till the path is unobstructed, begin movement and slow down or wait as it nears the obstruction, move along the path until required to divert around the object before reacquiring the path, or simply select an alternative aisle.

In step 412, multiple images are captured and stitched together. These stitched images, along with depth information created by distance ranging systems (including but not limited to LIDAR or time-of-flight systems), an infrared depth sensor, ultrasonic, systems that infer depth from stereo images, or systems that project an infrared mesh overlay that allows rough determination of object distance in an image, or other suitable system capable of distinguishing depth at a about a ten centimeter or less scale (including, but not limited to centimeter scale, sub-centimeter scale, or millimeter scale), are used to create a realogram (step 414). The realogram uses shelf labels, barcodes, and product identification databases to identify products, localize product placement, estimate product count, count the number of product facings, or even identify or locate missing products. This information is communicated to a remote server (step 416) for use by, for example, store managers, stocking employees, or customer assistant representatives. Additionally, in realogram or other information received from other robots, from updated product databases, or from other stores can be used to update or assist in creation of subsequent realograms (step 418).

Typically, stitched or original images are segmented, and the segmented images are used to help define a product bounding box that putatively identifies a product facing. This information is often necessary to develop a product library. A segmented image can include multiple product bounding boxes, typically ranging from dozens to hundreds of outlined or distinct image areas. The bounding boxes can surround either product facings, groups of products, or gaps between products.

In one embodiment, the product bounding box, with suitable identifiers, can be registered to a simple or panoramic stitched image of the shelf, and image descriptors extracted for the portion of the image contained in the bounding box. Methods for generating image descriptors include but are not limited to: image templates, Histogram of Gradients, Histogram of Colors, the Scale Invariant Feature Transform, Binary Robust Independent Elementary Features, Maximally Stable Extremal Regions, Binary Robust Invariant Scalable Keypoints, Fast Retina Keypoints, Kaze features, and variations thereof.

An alternative to extracting product descriptors is to use the bounding boxes as labeled categories and train classifiers on the images contained in the bounding boxes. Classifiers may include those based on deep structured learning, hierarchical learning, deep machine learning, or other suitable deep learning algorithms associated with convolutional, feedforward, recurrent, or other suitable neural network. A deep learning based classifier can automatically learn image descriptors based on an annotated training data. For example, deep learning based image descriptors can be hierarchical, corresponding to multiple layers in deep convolutional neural networks. The final layer of a convolutional layer network outputs the confidence values of the product being in one of the designated image categories. The image descriptor generator part and the classification part get integrated in a convolutional neural network and these two parts are trained together using a training set.

Alternatively, or in addition, embodiments that use both deep learning based image descriptors and conventional image descriptors can be combined in a hybrid system.

In still other embodiments, the image descriptors can be classified and labelled with the identifier. Classification algorithms that can include but are not limited to support vector machine. This process can be repeated for every image of the bounding box associated to the same identifier, whether the image is captured in the same store at different times, or in different stores. In time, this allows automatically building a product library (i.e. the "Library of Products"), without requiring an initial planogram or storage of specific product databases.

In one embodiment, products within product bounding boxes can be manually identified, identified using crowd source or paid reviewer image identification systems, identified with or without the aid of an initial planogram or realogram, or automatically identified using various image classifiers discussed herein. Gaps between products are useful for identifying shelf spacings, product separation, or missing/absent inventory.

Automatic identification can be performed using an autonomous robot, alone or in combination with an external image classifier system. In certain embodiments, a product bounding box can be defined as the horizontal space on the shelf occupied by one or more copies (facings) of the same product, along with the vertical space spanning the distance between a current shelf and the shelf above it. When the current shelf is the top shelf, the vertical space is a number generally corresponding to the distance to top of the fixture. The vertical space can alternatively be top of the product as sensed by depth sensors.

Image segmentation to automatically assist in creation of product bounding boxes and product identification can rely on use of image templates in some embodiments. Typically, each image template is compared with the image captured by a camera system mounted on an autonomous robot. If a match is positive, the matched section of the image is used as the image segmentation for that product. In other embodiments, image segmentation can be supported by machine learning systems, including but not limited to deep learning methods.

As will be appreciated, other aspects of realogram development can also be supported by a wide range of automated, semi-automated, or manually provided classifiers. Classification algorithms such as convolution neural networks or other deep learning methods, template matching or HAAR cascades can be used to aid in detection of each shelf label. Each shelf label is analyzed to obtain one or more product identifiers. Analysis may include but is not limited to optical character recognition, barcode scanning, QR code scanning, AR code scanning, or hologram code scanning. Product identifiers may be UPC code, the product name, or a coded collection of letters, numbers, or other symbols. If more than one identifier is available, a preferred identifier such as the UPC code can be selected. In certain embodiments, infrared or ultraviolet detectable product identifiers embedded on product packaging or shelf labels can be used, as well as any other suitable tag, marker, or detectable identifying indicia such as a visible UPC code or serial number on the product packaging.

Figures 5A, 5B:
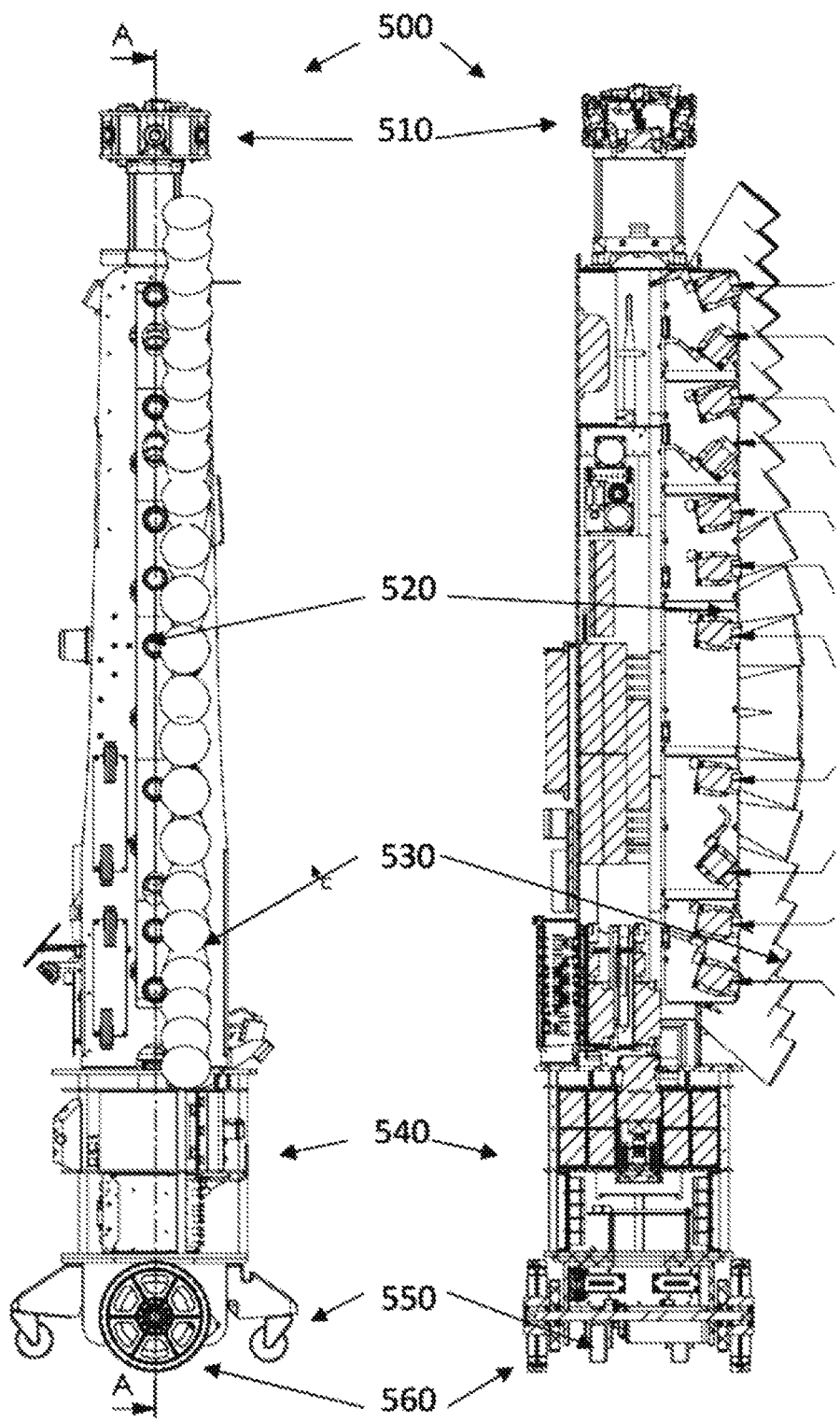
FIG. 5A is a side view of an autonomous robot capable of acting as a mobile base unit for a camera system in accordance with an embodiment.
FIG. 5B is a cross sectional view of the autonomous robot of FIG. 5A.

If a product library is created or made available, the library can be searched for realogram related information. For example, products objects with a large number of similar features can be used to assist in developing the product bounding box. For each potential product object match, the geometric consistency of the feature locations in the library can be compared with the features in a shelf image. Some methods further include indexing the sets of descriptors within the library for improved searching performance and/ or reduced storage requirements. Indexing methods include but are not limited to: hashing techniques, tree representations, and bag-of-words encodings. Alternatively, planograms, realograms, other product information, or product location information from the product library can be used to reduce the number of products that must be searched to just those products contained within the imaged shelf. In still other variations, identified products can be verified by segmenting and decoding the price tag or product label located proximally to each identified product and comparing it to the product object identifier. FIGS. 5A and B are respectively examples in side view and cross section of an autonomous robot 500 capable of acting as a mobile base for a camera system in accordance with this disclosure. The robot navigation and sensing unit includes a top mount sensor module 510 with a number of forward, side, rear, and top mounted cameras. A vertically aligned array of lights 520 is sited next to a vertically arranged line of cameras 530, and both are supported by a drive base 540 that includes control electronics, power, and docking interconnects. Mobility is provided by drive wheels 560, and stability is improved by caster wheels 550.

Figure 6:
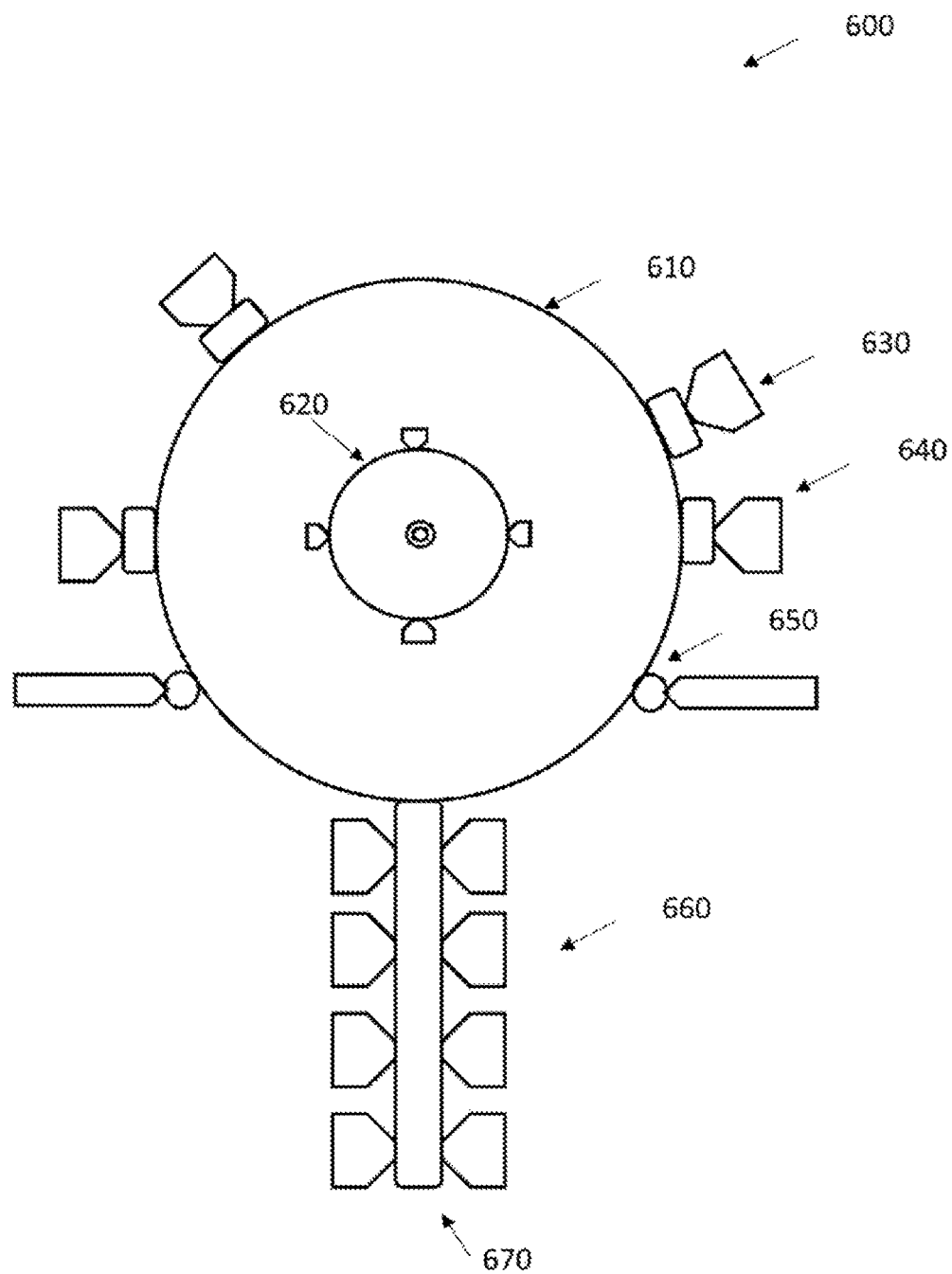
FIG. 6 is a top view (looking down) of various possible camera support sites on a mobile base in accordance with an embodiment.

FIG. 6 is a top view, looking down, of camera platform 600 with various possible camera support sites situated on a mobile base 610. The mobile base 610 has a top mounted camera and sensor suite 620 (optionally viewing over 360 degrees) to aid in positioning and navigating the mobile base 610 with respect to shelves (or other fixtures capable of holding inventory or products) in a retail store or warehouse aisle, and to capture 360-deg or spherical images of the environment. Fixedly mounted cameras 630 and 640 can be positioned to point at a perpendicular angle with respect to mobile base motion or slightly angle forward. In certain embodiments, a controllable gimble or tilt mount 650 can be used to point a camera in a desired direction. In other embodiments, a boom 670, horizontally extending from the mobile base 610, can be used to support multiple linearly extending cameras that are directed to simultaneously capture images from each side of an aisle. In another embodiment, high-resolution cameras can be directed to point to one side of the aisle to read barcodes and identify labels, and low-resolution cameras are pointed toward the other side of the aisle. In this embodiment, the low-resolution cameras simply detect labels and match them to previously identified labels. When the robot navigates back along an aisle, the respective high resolution and low-resolution cameras supported by the robot can scan opposite sides. In still other embodiments, two-dimensional arrays of cameras or 360 degree cameras mounted at various positions on the mobile base 610 or camera platform 600 can be used. In some embodiments, the mobile base 610 and fixedly mounted cameras 630 (and any of the camera systems described herein) can be used for navigating hallways, paths, roads, and other surfaces for capturing images of other environments, including but not limited to, libraries, archives, storage containers, wine cellars, museums, gardens, parking lots, factories, depots, data centers, etc.

Figure 7:
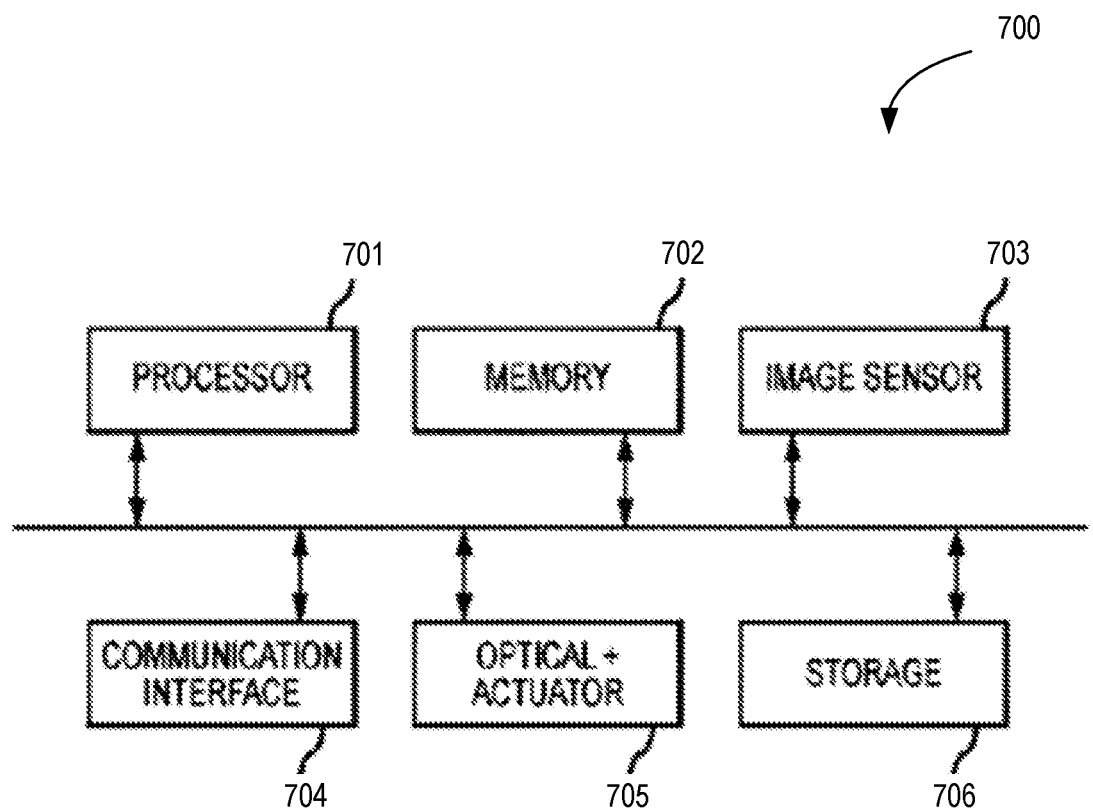
FIG. 7 is a block diagram of a camera system in accordance with an embodiment.

As shown in FIG. 7, a movably mounted camera system 700 can be used to implement the disclosed system and method can be an "IP camera" (i.e., a camera capable of communicate using the Internet Protocol), a USB camera (i.e., a camera having a Universal Serial Bus interface), or a camera capable of communicating with another device by any suitable means. As shown in FIG. 7, the camera system 700 includes processor 701, memory 702, image sensor 703, communication interfaces 704, camera optical and actuator system 705, and storage 706. The processor 701 controls the overall operations of the camera, such as operating camera optical and actuator system 705, and communication interfaces 704. The camera optical and actuator system 705 controls the operations of the camera, such as exposure control for image captured at image sensor 703. The camera optical and actuator system 705 may include an adjustable lens system (e.g., zoom and automatic focusing capabilities). The camera can be fixedly or movably mounted to point downwardly or upwardly. In certain embodiments a wide field or fish-eye camera can be used. Alternatively, a narrow field, zoomable telephoto camera or a high resolution, tilt controllable, height adjustable camera can be used.

In some embodiments, the camera optical and actuator system 705 may include or be associated with an infrared (IR) illumination system (e.g., IR light from light-emitting diodes (LED)) or any suitable illumination system for supplementing light when an environment does not provide sufficient illumination (e.g., at night). In certain embodiments multiple cameras and/or LEDs can be used to reduce glare from highly reflective surfaces, since multiple cameras pointed in slightly different directions can result in at least one image with little or no glare. Lights can be mounted along with, or separately from, the sensors, and can include monochromatic or near monochromatic light sources such as lasers, light emitting diodes (LEDs), or organic light emitting diodes (OLEDs). Broadband light sources may be provided by multiple LEDs of varying wavelength (including infrared or ultraviolet LEDs), phosphor supported white LEDs, halogen lamps or another suitable conventional light source. Various spectral filters that may include narrowband, wideband, or polarization filters and light shields, lenses, mirrors, reflective surfaces, diffusers, concentrators, or other optics can provide wide light beams for area illumination or tightly focused beams for improved local illumination intensity.

According to some embodiments, the cameras such as described with respect to FIG. 7 (or any of the other cameras or camera systems described herein) can be mounted on an autonomous robot such as described with respect to FIG. 2 (or any of the other autonomous robots or movable bases described herein). The autonomous robot is movable alongside a shelf and can be operated to capture multiple focus stackable photographs. In some embodiments, combined or panoramic views having differing focus depth can be captured. In some embodiments, the robot can include multiple cameras (each with a lens, sensor and processor) stacked vertically and facing a product shelf (such as a shelf of a supermarket or store). The robot can be set to move laterally beside the shelf at a constant speed (e.g., about 0.2-0.3 m/sec), maintaining a constant distance from an outer periphery of the shelf (e.g., about 15-30 centimeters). The depth of the shelf extending away from the robot from the outer periphery of the shelf can be much larger than this distance (e.g., about 50-100 centimeters), a distance too large for a fixed-focus camera to capture the entire depth of the shelf with all objects being in adequate focus.

The processor of each camera can instruct a lens to cycle between three focus positions, each covering a portion of the shelf depth. For example, position 1 may cover the front 7 centimeters, position 2 may cover the middle 18 centimeters, and position 3 may cover the back 28 centimeters, together providing effective coverage for the entire shelf depth of 56 centimeters.

All the images are captured in slightly different positions in the horizontal domain (since the robot moves constantly to the right), but the frames can be captured fast enough that there is sufficient overlap for a complete panorama to be created at each of the three focus depths (in effect, each object appears in at least three images, ensuring that it is in adequate focus in at least one of the images).

Figure 8:
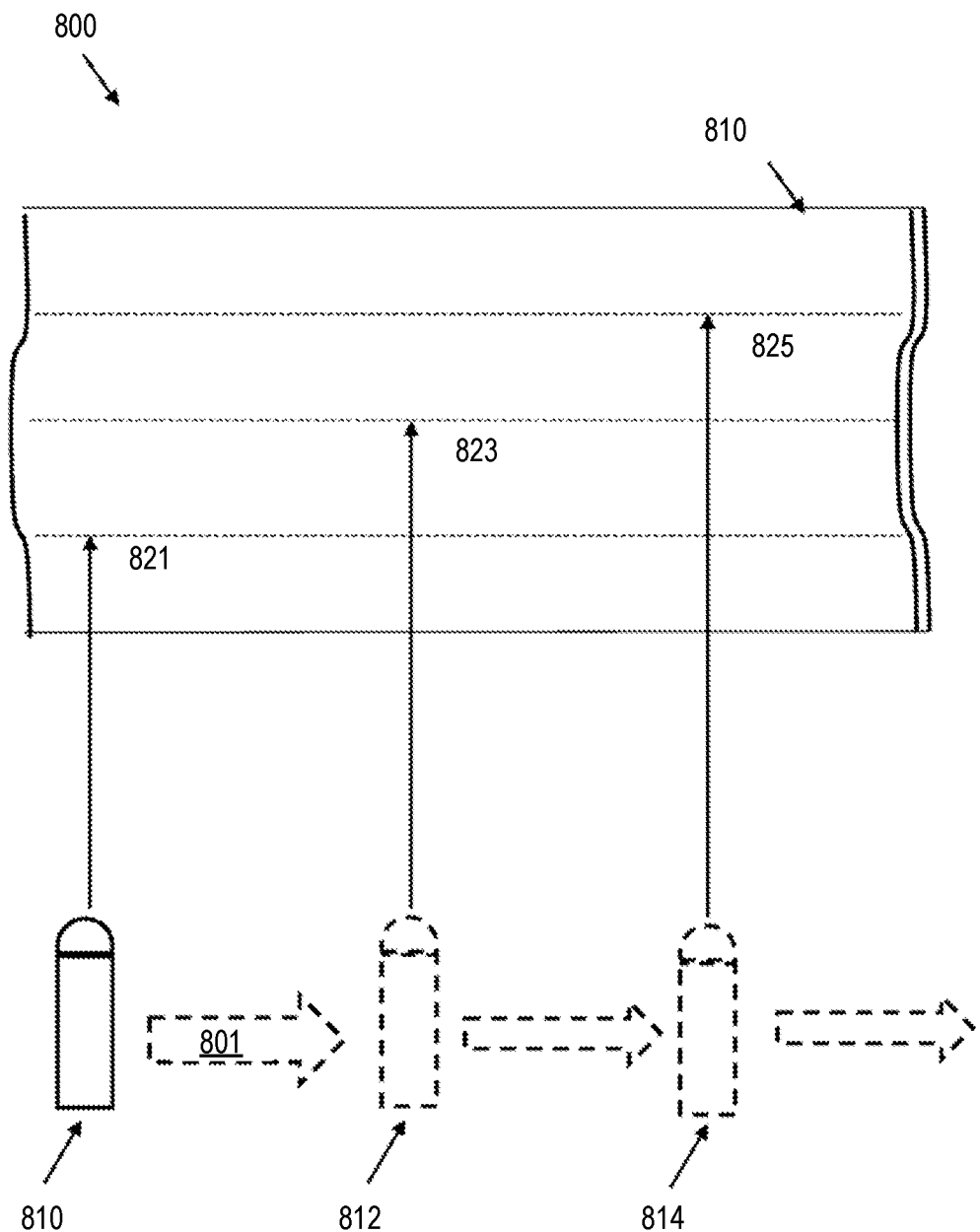
FIG. 8 is a top view (looking down) of movement of a camera alongside a shelf to capture images at different focus depths in accordance with an embodiment.

FIG. 8 is a top view depicting an aisle or storage area 800 including at least one shelf 805. A camera 810 can be moved (direction noted by arrow 801) laterally alongside the shelf 805 and be set to periodically capture photos at different focus depths 821, 823, and 825.

Figure 9:
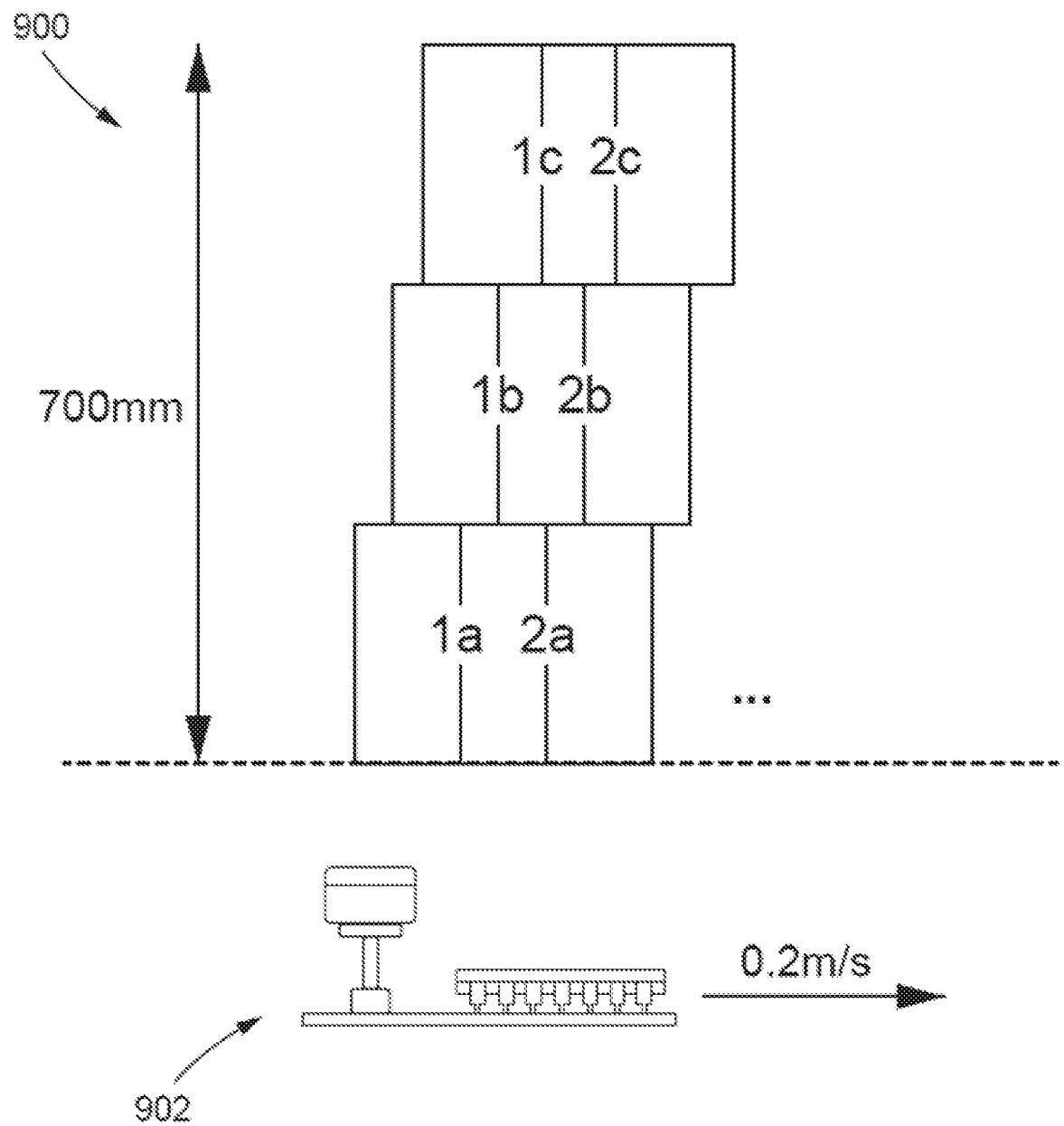
FIG. 9 is a diagram illustrating the capture of overlapping fields with a moving camera in accordance with an embodiment.

FIG. 9 is a diagram 900 illustrating (in top view) capture of overlapping image fields along a length of a 700 millimeter wide shelf using a camera 902 moving at 0.2 meters per second. As illustrated, movement of the camera is slow enough to allow substantial overlap between image fields of differing focus depths (e.g. 1a, 1b, and 1c), as well allowing for optional merger of images having the same focus depth (e.g., 1b, 2b) or different focus depth (e.g., 1a, 2c) to form at least one panoramic image. As will be appreciated, a panoramic image does not necessarily have to be formed from the captured images. For example, if all barcodes and product facings in a selected section are positioned at a front edge of a shelf, panoramic images can be based on images 1a and 2a.

Figure 10:
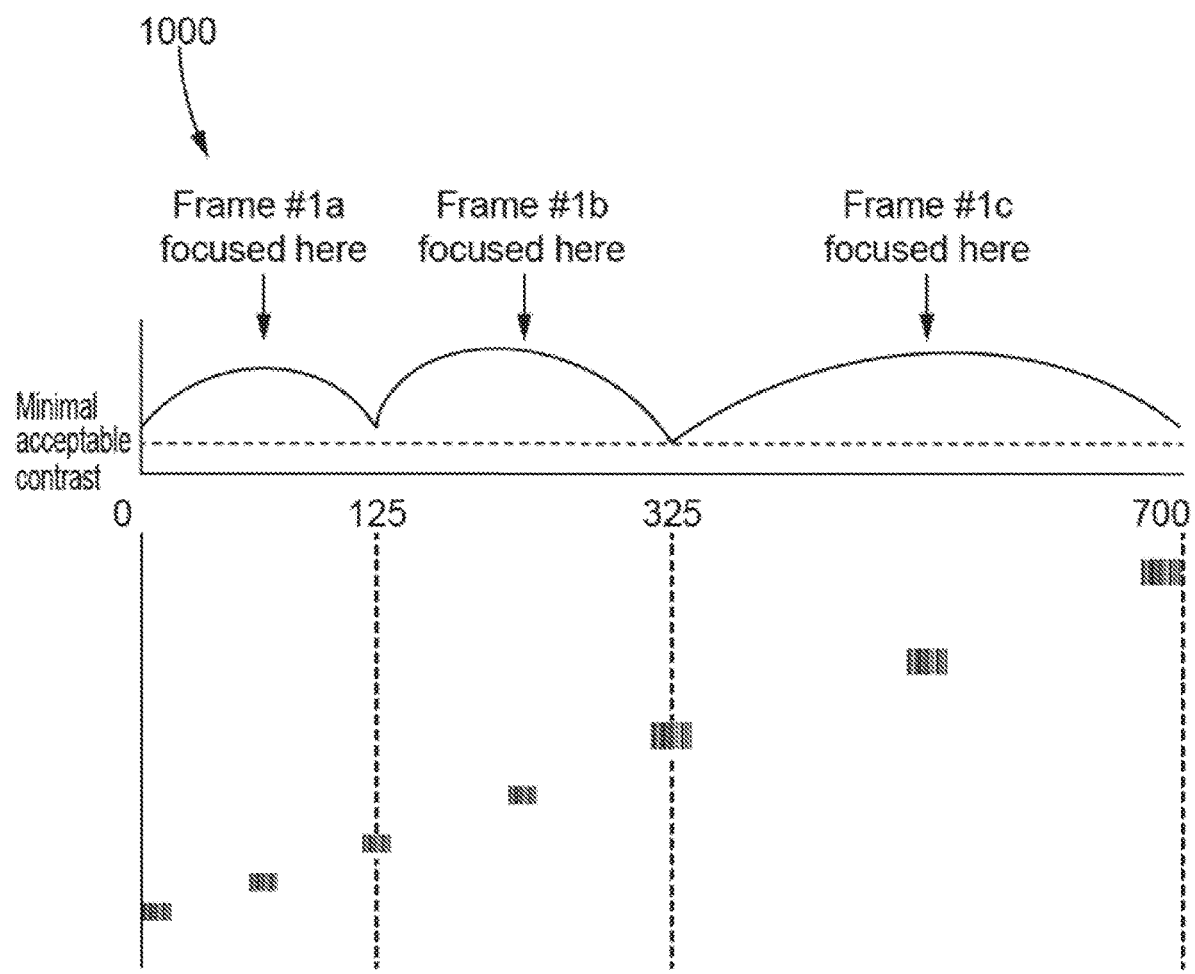
FIG. 10 is diagram illustrating the capture of barcode information by selecting an image with best focus in accordance with an embodiment.

FIG. 10 is a diagram 1000 illustrating the capture of label information (e.g., a barcode) by selecting an image with best focus from images captured at different focus depths. As will be understood, label information can include one or two dimensional barcodes, QR codes, text or numbering capturable by OCR technology, color or patterned symbols, pricing information, product information, artwork, packaging designs or any other suitable markings or indicia related to a product. Typically, such product related indicia have a relatively small sizes, with vertical and horizontal dimensions respectively less than 5 centimeters. Image capture of barcodes or other suitable indicia can be ensured by ensuring frequency of image capture under camera displacement is large enough that consecutive images at the same focus depth overlap over a region larger than the length of the barcode, such that an entire barcode is guaranteed to be contained within a single image.

Any of the systems described herein can have different modes of operation, depending on resource constraints such as bandwidth and available processing power. For example, a camera's processor may pre-process the images it captures and attempt to recognize all barcodes at a node, assign 2D coordinates to them, and send the pre-processed data along with coordinates and images from a single depth (e.g., front of the shelf) to a main processing unit that will combine images from all cameras into a single panorama (at a single depth, e.g., front of the shelf) and cross-correlate the locations of the scanned barcodes to objects in the panorama.

Alternatively, system may first send all images taken at a single depth to a main processing unit, which will combine images from all cameras into a single panorama (at a single depth, e.g., front of the shelf), and run a label detection algorithm to detect the locations of all visible labels and map them to 2D space. The system will then attempt to find these labels in the various images (captured at the various depths) that include this 2D location, select the image in which this label is most in focus, and only then run a barcode decoding algorithm on the part of the image that corresponds to this 2D location (this can be done either on the camera processor or on the main processor).

In some embodiments, any of the systems described herein can execute an algorithm that can map between objects in a panorama view image and coordinates in 2D space. In other embodiments, given a physical location in 2D space, an algorithm can be used to scan across multiple images in which this location is visible, selecting the one in which this location is visible in the best focus, and decoding a barcode at this location. In some embodiments, barcodes are decoded on every image captured by the camera at every depth of focus. This computation can take place on a processor onboard the camera, or in electronic control unit 120.

In some embodiments, image quality or functionality factors such as number of focus positions, speed of camera movement, frame rate of the camera, specific focus depth, captured resolution, effective ISO, amount of directed lighting, or the like can be dynamically adjusted. For example, focus position and/or frequency of image capture can be dynamically modified according to local conditions. An autonomous robot with dynamically programmable camera system can capture images at two separate focus depths while moving along a first aisle. When the autonomous robot moves from a first aisle to a second aisle having a deeper shelf depth, images at three separate focus depths can be captured, and movement of the autonomous robot and camera system slowed to ensure adequate image overlap at each focus depth. In one embodiment, focus depths can be adjusted using input related to shelf distance taken from depth sensing or positioning mechanisms supported by an autonomous robot.

As described herein, an autonomous robot may be configured to move alongside an area of interest and capture images that may include target objects of interest. For example, the robot may be configured to move alongside shelves (i.e., substantially parallel to the front face or a longitudinal axis of the shelves) in an aisle of a store and capture images of the shelves along with items on or attached to the shelves. To quickly scan the shelves for target objects of interest (e.g., products, tags, price labels, shelf labels, and/or barcodes) and reduce disruptions for other patrons or users, it may be advantageous for the robot to be capturing images while in motion to minimize the time the robot is moving down or stopped in the aisles.

To ensure that details of target objects are not blurred or washed out from glare, particularly when a distance from the camera to the target objects are not precisely known, the same or similar frame of image can be captured at different focus depths. For example, images can be captured at three or more focus depths. To further reduce glare, a light source may be angled relative to a camera's focus direction to minimize light from being reflected from a target object back into the camera. Additionally, to ensure sufficient lighting is provided to objects that may be located at different focus depths, two or more light sources positioned at different angles relative to the camera's focal direction are provided to enable light to be optimally directed towards the potential target object and to improve edge detection of the potential target object. Furthermore, to ensure that potential target object is not too dimly illuminated (resulting in an image to dark to decipher details) or too brightly illuminated (resulting in an image that is washed out with light), the power output of the two or more light sources can be adjusted according to an operating condition of the camera. Moreover, the power output of the two or more light sources can be adjusted or set to ensure even lighting of the potential target object and/or even lighting of each frame of image captured to promote an even lighting balance and to minimize presences of edges or boundaries when multiple images are stitched, as described herein. In some embodiment, each camera is provided with two dedicated light sources, each of the two light sources being positioned and aimed at different angles relative to the camera's focal direction. In some embodiments, each camera is provided with three dedicated light sources, each of the three light sources being positioned and aimed at different angles relative to the camera's focal direction.

Figure 11:
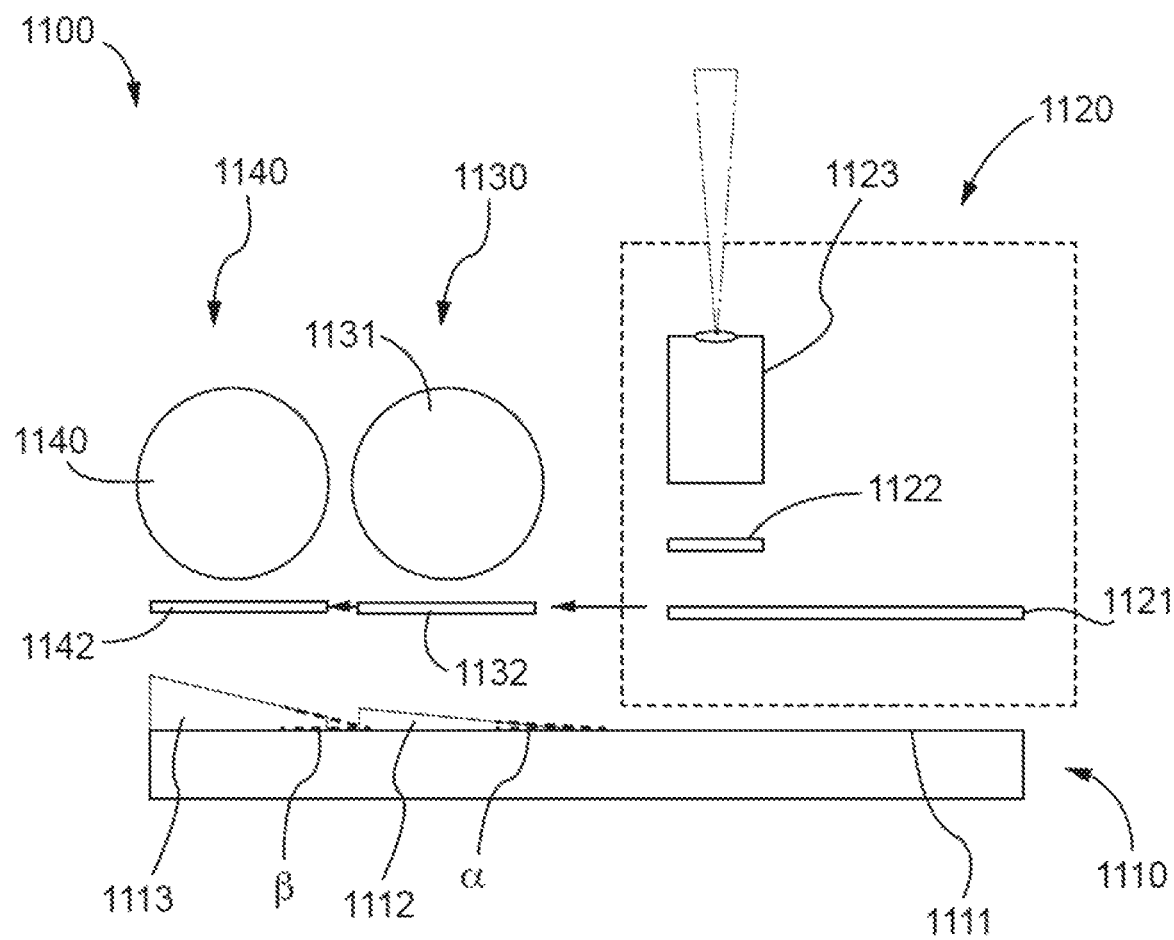
FIG. 11 a schematic illustration depicting an image capture module in accordance with an embodiment.

In some embodiments, as shown in FIG. 11, an image capture module 1100 includes a mounting bracket 1110, a camera module 1120, a first light module 1130, and a second light module 1140. The image capture module 1100 can be included within any of the autonomous robots or camera systems described herein. The mounting bracket 1110 includes a first mounting portion 1111 for receiving and supporting the camera module 1120, a second mounting portion 1112 for receiving and supporting the first light module 1130, and a third mounting portion 1113 for receiving and supporting the second light module 1140. The first mounting portion 1111 includes a first surface that defines a camera mounting plane (shown as being horizontal in FIG. 11, but that can be in any suitable orientation). The second mounting portion 1112 includes a second surface that extends at an angle relative to the camera mounting plane. The third mounting portion 1113 includes a third surface that extends at an angle relative to the camera mounting plane. In some embodiments, the camera mounting plane (or first surface) of the first mounting portion 1111 and a plane of the second mounting portion 1112 intersect to define a first angle α (i.e., first acute angle relative to the camera mounting plane). The plane of the first mounting portion 1111 and a plane of the third mounting portion 1113 intersect to define a second angle β (i.e., second acute angle relative to the camera mounting plane), the second angle β being different from the first angle α. In some embodiments, the second angle β is greater than the first angle α. Although the first mounting portion 1111, the second mounting portion 1112, and the third mounting portion 1113 are shown and described as being a part of the mounting bracket 1110, in some embodiments, the first mounting portion 1111, the second mounting portion 1112, and the third mounting portion 1113 can be individually or jointly provided on one or more of the frame, chassis, and/or body of the robot. Furthermore, any of the method described herein can be performed on any suitable assembly, including those that may not have the mounting bracket 1110, or may not include the first mounting portion 1111, the second mounting portion 1112, and the third mounting portion 1113. For example, in some embodiments, the mounting bracket 1100 can be a planar bracket for mounting one or more of the camera module 1120, the first light module 1130, and the second light module 1140. In some embodiments, one or more of the first light module 1130, and the second light module 1140 can be mounted on a mounting bracket or other mounting structure separate from a mounting bracket or other mounting structure of the camera module 1120.

The camera module 1120 can include a control board 1121, a camera sensor 1122, a lens 1123. In some embodiments, the lens is adjustable and/or motorized to change a focus depth of the camera. The control board 1121 can include a system on chip (SoC), memory (e.g., DDR, NAND), a motor driver, a power line, and a data line (e.g., ethernet). In some embodiments the SoC can include a quad-core processor and controllers for peripheral hardware. The first light module 1130 includes a light element 1131 and a circuit board 1132. The second light module 1140 includes a light element 1141 and a circuit board 1142. The light elements 1131, 1141 can each be a light emitting diode (LED) or any other light sources described herein, including monochromatic or near monochromatic light sources. Although a single LED is shown with each of the first light module 1130 and the second light module 1140, the first light module 1130 and the second light module 1140 (and any other light modules described herein) can each be provided with an array of multiple LEDs.

The circuit boards 1132, 1142 can be a printed circuit board assembly for supplying power to the respective lighting elements 1131, 1141. In some embodiments, the circuit boards 1132, 1142 are operably coupled to the control board 1121 of the camera and power may be obtained from a battery of a robot that is supplied to the control board 1121 of the camera module 1120. Based on an operational state of the camera module 1120, a predetermined amount of power may then be supplied from the control board 1121 to the circuit board 1132 of the first light module 1130 and the circuit board 1142 of the second light module 1140 to adjust the amount of light generated by the first light module 1130 and/or the second light module 1140. One or more camera modules 1120 can be used together with or used in the place of any of the other cameras described herein, such as for example, the cameras for the inventory monitoring camera system 100, the autonomous robot 500, the camera platform 600, the movably mounted camera system 700, camera 810, the and camera 902.

In some embodiments, as shown in FIGS. 12-16, an image capture module 1200 includes a mounting bracket 1210, a camera module 1220, a first light module 1230 (which can also be referred to as "near light source" or "near LED"), and a second module 1240 (which can also be referred to as "far light source" or "far LED"). The image capture module 1200 can be used with any of the systems described herein.

In some embodiments, a method of capturing an image of a target object includes determining a focal distance of the camera module 1120 to the target object. The method includes sending a first signal to the first light module 1130 to emit a first light beam to at least a first portion of the target object at a first light intensity, and the first light intensity is associated with the focal distance. The method includes sending a second signal to the second light module 1140 to emit a second light beam at least a second portion of the target object at a second light intensity. The second light intensity is different from the first light intensity, and the second light intensity is associated with the focal distance. The method includes capturing, via the camera module 1120, the image of the target object during a time period when the target object is illuminated by the first light beam of the first light module and the second light bream of the second light module. In some embodiments, the first portion of the target object overlaps with the second portion of the target object. In some embodiments, the camera module 1120, the first light module 1130, and the second light module 1140 are each coupled to a mounting bracket 1110.

The mounting bracket 1210 includes a first mounting portion 1211, a second mounting portion 1212, and a third mounting portion 1213 on a first side of the mounting bracket 1210. The mounting bracket 1210 further includes a fourth mounting portion 1219 on a second side of the mounting bracket 1210 opposite the first side. The first mounting portion 1211 is configured to receive and support the camera module 1220, the second mounting portion 1212 is configured to receive and support the first light module 1230, and the third mounting portion 1213 is configured to receive and support the second light module 1240. The fourth mounting portion 1219 is configured to mount to a chassis or frame of an autonomous robot, such as described with respect to FIG. 2, or any of the other autonomous robots or movable bases described herein. Although the first mounting portion 1211, the second mounting portion 2112, and the third mounting portion 1213 are shown and described as being a part of the mounting bracket 1210, in some embodiments, the first mounting portion 1211, the second mounting portion 1212, and the third mounting portion 1213 can be individually or jointly provided on or with one or more of the frame, chassis, and/or body of the robot.

Figure 13:
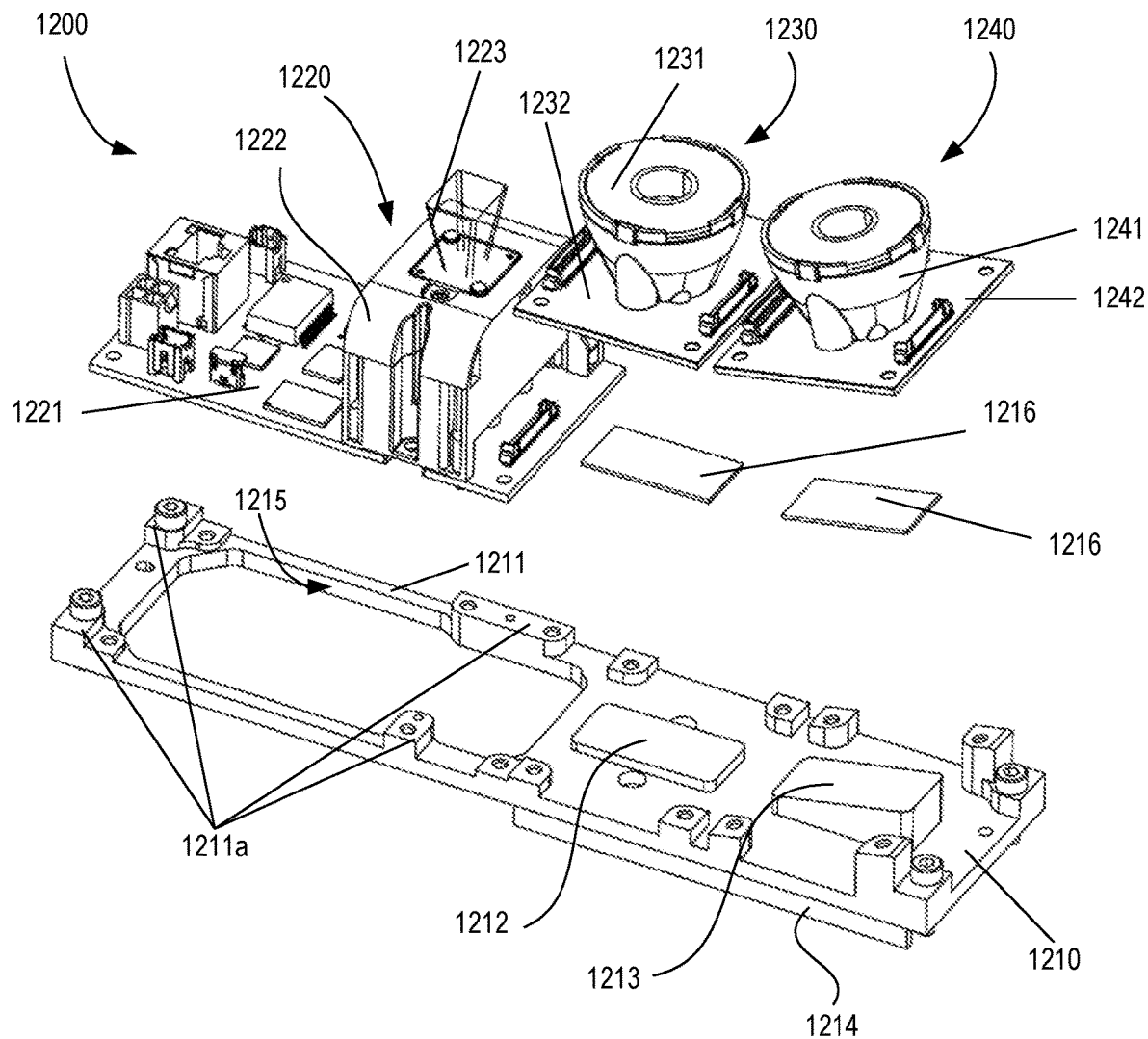
FIG. 13 is an exploded view of the image capture module of FIG. 12.

The first mounting portion 1211 is configured to minimize thermal contact between the camera module 1220 and the mounting bracket 1210. As shown in FIG. 13, the mounting portion 1211 includes one or more mounting posts 1211*a* for supporting the camera module 1220 while minimizing thermal contact with the mounting bracket 1210. The mounting bracket 1210 defines a cutout 1215 to further minimize thermal contact between the camera module 1220 and the mounting bracket 1210, thereby promoting even temperature distribution and reliable operation of the camera. In other embodiments, a mounting bracket 1210 can include other features to limit heat transfer between the camera module 1220 and the bracket 1210. For example, thermally insulating pads can be mounted between the camera module 1220 and the mounting bracket 1210 at each of the mounting posts 1211*a*. This arrangement can limit the undesirable heat from the light modules 1230, 1240 being transmitted to the camera module 1220 via the bracket 1210.

Figure 15:
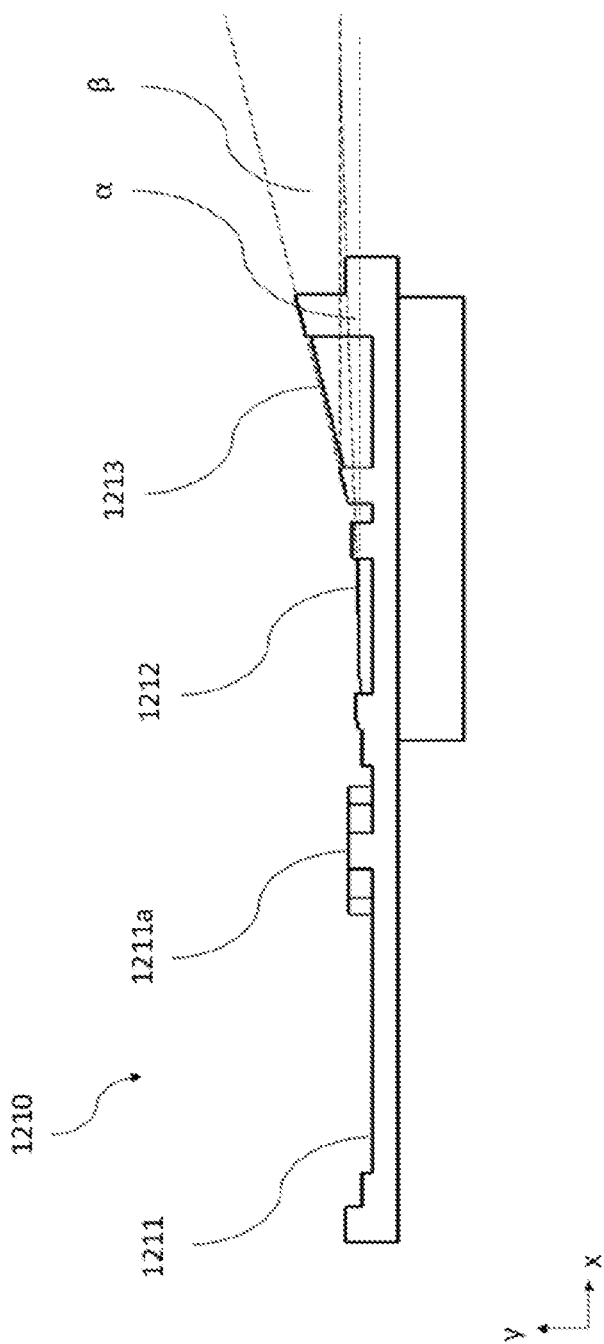
FIG. 15 is a side view of a mounting bracket of the image capture module of FIG. 12.

The first mounting portion 1211 extends parallel to a longitudinal axis of the mounting bracket 1210 (e.g., lengthwise direction along x-axis in FIG. 15, the naming of the x-axis being arbitrary). The second mounting portion 1212 extends at a first angle α relative to the longitudinal axis of the mounting bracket 1210. The third mounting portion 1213 extends at a second angle β relative to the longitudinal axis of the mounting bracket 1210. In some embodiment, the first angle α is 0.5 to 5 degrees and the second angle β is 3 to 20 degrees. In some embodiment, the first angle α is 1 to 1.5 degrees and the second angle β is 8 to 12 degrees. By way of example, the first angle α is 1 to 1.5 degrees and the second angle β is 8 to 12 degrees where a minimum focus depth is about 300 millimeters. In other embodiments, the second mounting portion 1212 can have a steeper angle than the third mounting portion 1213 relative to the longitudinal axis of the mounting bracket 1210. In other words, the first angle α can be greater than the second angle β. For example, the first angle α can be 3 to 20 degrees and the second angle β can be is 0.5 to 5 degrees.

Figure 16:
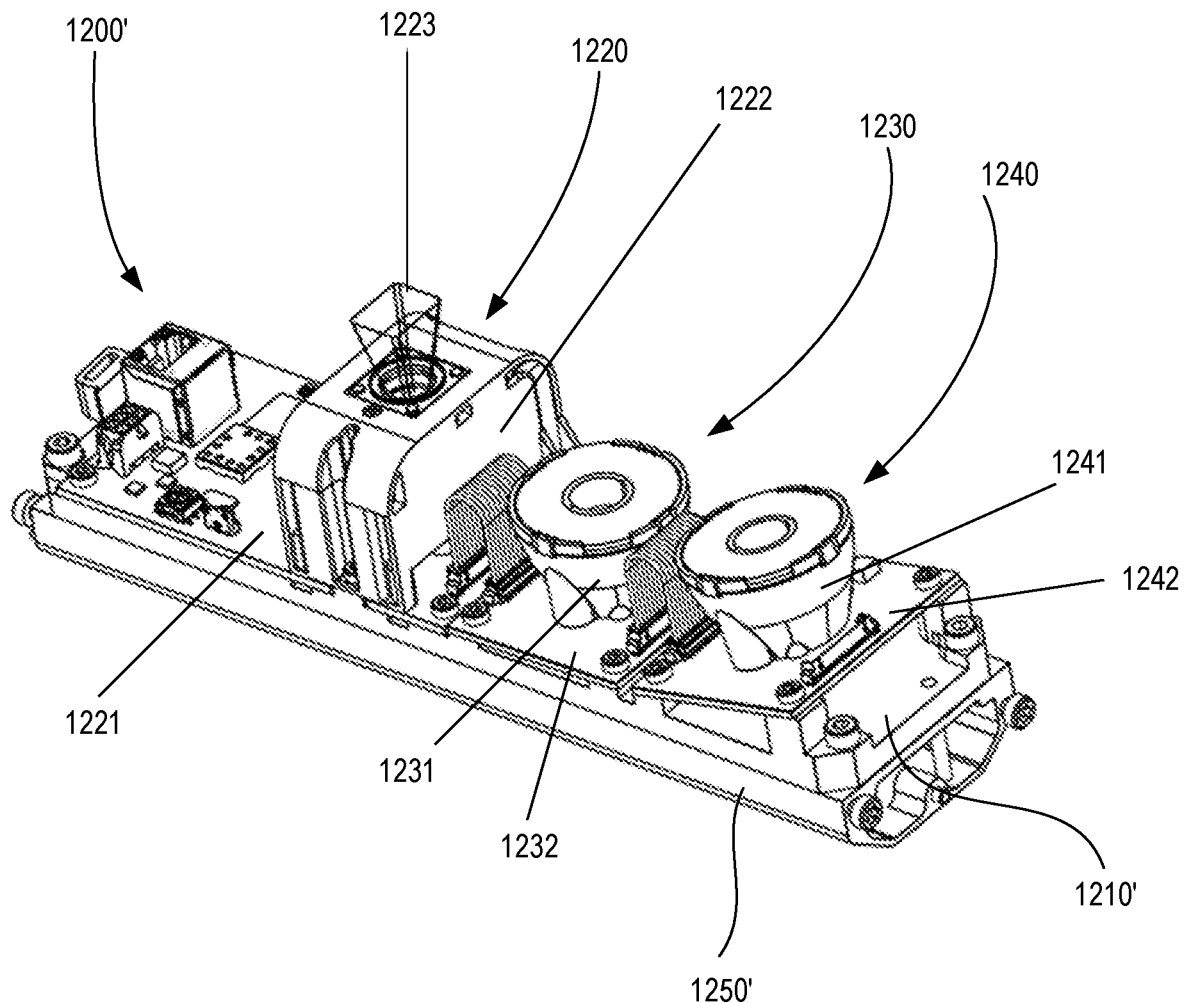
FIG. 16 is a perspective view of an image capture module in accordance with an embodiment.

As generally shown in FIG. 16, an optical axis ($A_o$) of the camera is aimed towards an area of interest (e.g., product shelf) with a potential target located at the distance D1 or beyond (e.g., located between distances D1 to D3). In some embodiments, the first angle α is selected such that a centerline ($CL_{L1}$) of a light beam emitted by the first light module 1230 extends along to the left of the optical axis ($A_o$) of the camera between at least distances D1 to D3. The second angle β is selected such that a centerline ($CL_{L2}$) of a light beam emitted by the second light module 1240 intersects with or extends along to the right of the optical axis ($A_o$) of the camera in at least distances D1 to D3. In this manner at least one of the first light module 1230 or the second light module 1240 is pointed to the left of center of an image captured by the camera module 1220 and the other of the first light module 1230 or the second light module 1240 is pointed to the right of the center at focal distances D1 to D3. It will be appreciated by one skilled in the art that if the first light module 1230 and the second light module 1240 are mounted to the right side of the camera module 1220 (e.g., mirrored to the opposite side of the camera module), the first angle α and the second angle β would be selected such that the centerline ($CL_{L1}$) of the first light module 1230 extends to the right of the optical axis ($A_o$) of the camera and that the centerline ($CL_{L2}$) of the second light module 1240 intersects with or extends to the left of the optical axis ($A_o$) of the camera. Although FIG. 16 shows the centerline $CL_{L2}$ as intersecting the optical axis ($A_o$) between distances D1 and D3, in other embodiments, the first angle α and the second angle β can be selected such that the centerlines $CL_{L1}$, $CL_{L2}$ extend away from and do not intersect with the optical axis ($A_o$). In yet other embodiments, the first angle α and the second angle β can be selected such that the centerlines $CL_{L1}$, $CL_{L2}$ are directed towards the optical axis ($A_o$) and the centerlines $CL_{L1}$, $CL_{L2}$ intersect the optical axis ($A_o$), such as intersect at points between distances D1 and D3.

Figure 12:
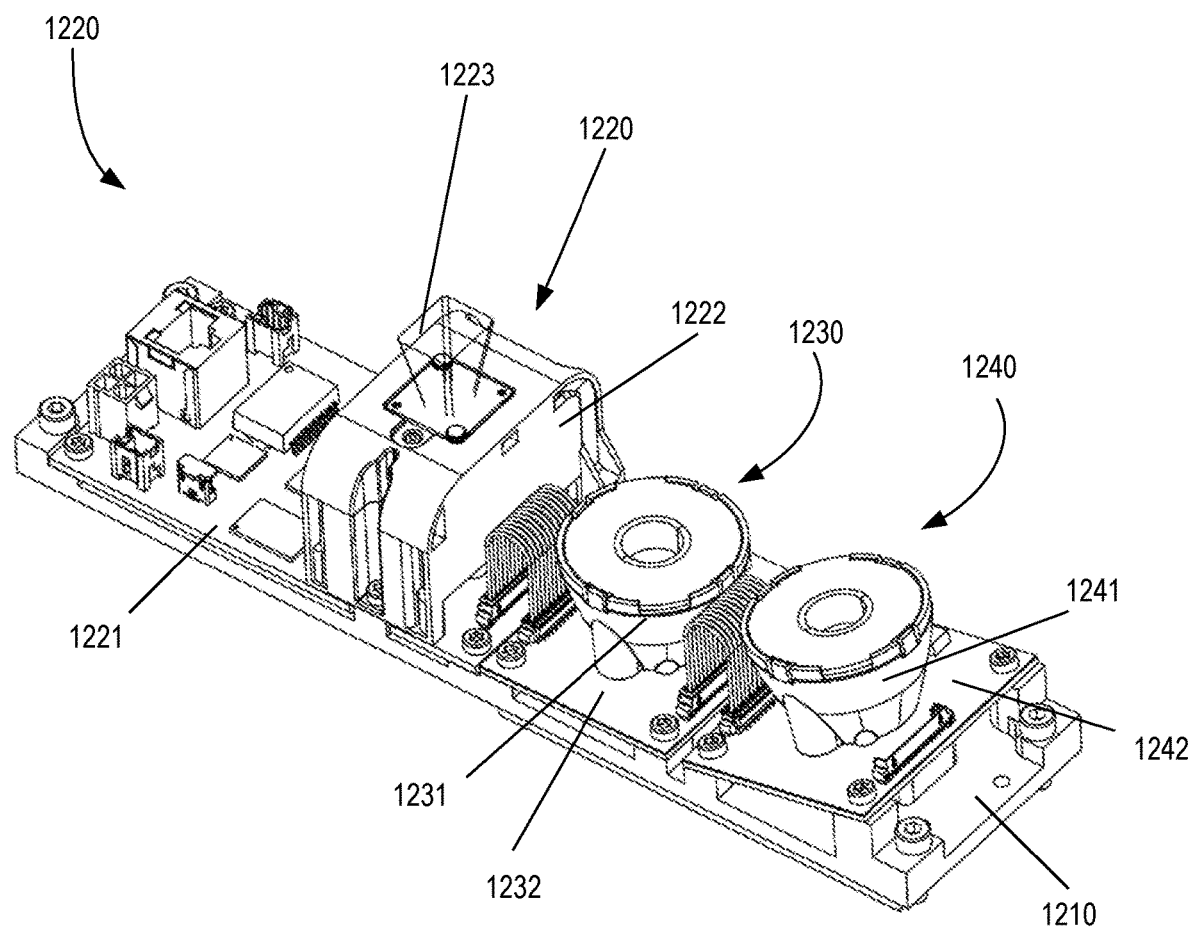
FIG. 12 is a perspective view of an image capture module in accordance with an embodiment.
Figure 19:
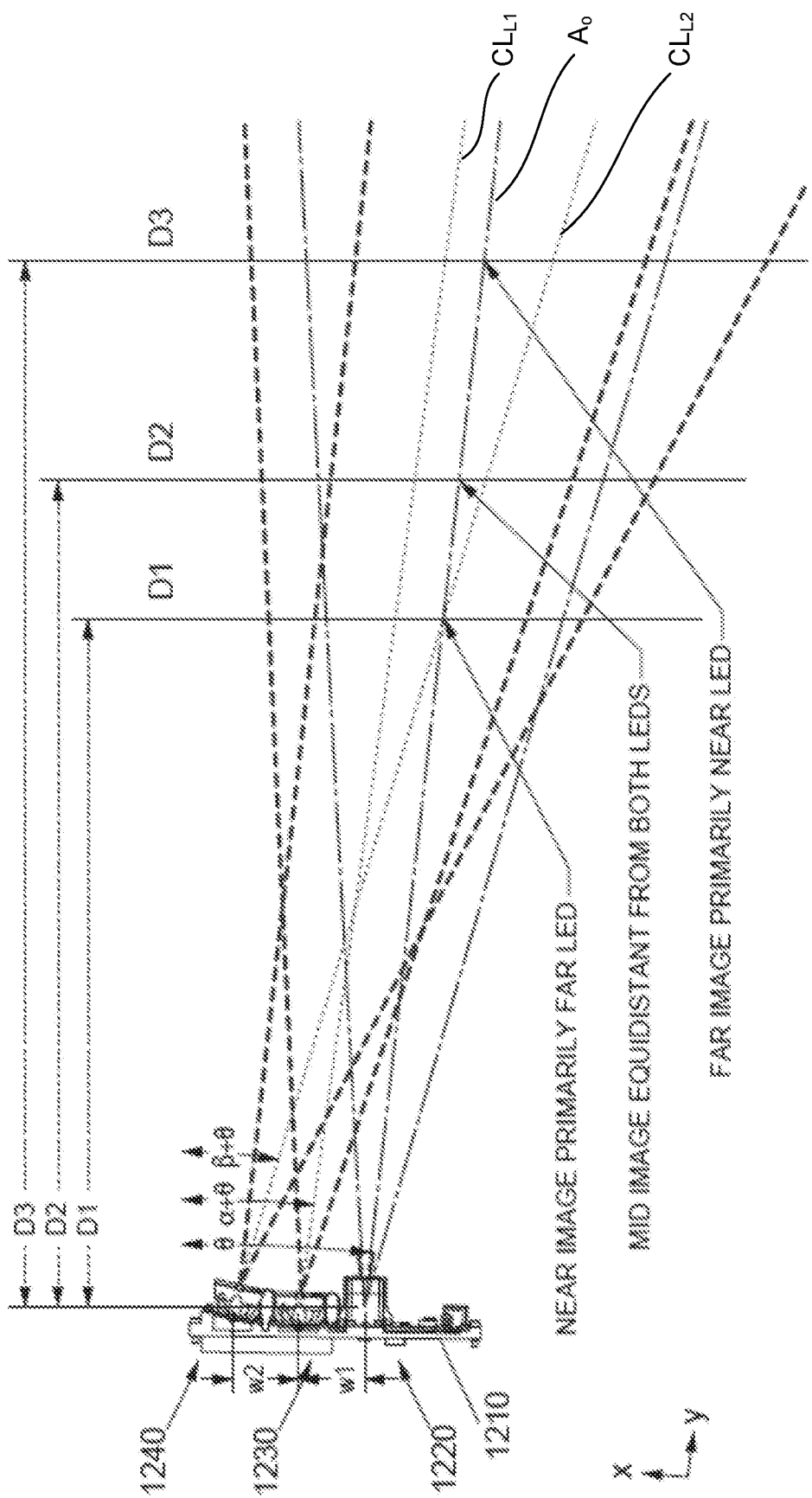
FIG. 19 is an exemplary field of view diagram for the image capture module of FIG. 12.

As shown in FIGS. 12, 16, and 19, a center of the camera sensor 1222 is spaced a fixed distance (e.g., 25-150 mm) from a center of the first light module 1230, and a center of the second light module 1240 is spaced a fixed distance (e.g., 25-150 mm) from a center of the first light module 1230. The fixed distances between these components can be any suitable value. In some embodiments, the distance between the camera sensor 1222 and the first light module 1230 is the same as the distance between the first light module 1230 and the second light module 1240. In other embodiments, the two distances can be different. In some embodiments as shown in FIG. 19, the camera sensor 1222 is spaced a first width (w1) of about 25-150 millimeters from a center of the first light module 1230, and a center of the second light module 1240 is spaced a second width (w2) of about 25-150 millimeters from the center of the first light module 1230. Although both the first light module 1230 and the second light module 1240 are illustrated as being mounted on one side of the camera sensor 1122 (e.g., along the x-axis), it will be appreciated that the first light module 1230 can be positioned a first distance on one side of the camera sensor 1222 and the second light module 1240 can be positioned a second distance on an opposite side of the camera sensor 1222, the second distance being greater than the first distance (with one of the first angle α or the second angle β being reversed accordingly). Similarly, in embodiments where three or more light modules are employed, the plurality of light modules may be arranged on a same side or on both sides of the camera sensor 1222.

In some embodiments, the mounting bracket 1210 including the first mounting portion 1211, the second mounting portion 1212, and the third mounting portion 1213 are monolithically formed. For example, the mounting bracket 1210 can be monolithically formed via die casting, forging, CNC machining of a single stock piece, and/or 3-D printed. By forming the first mounting portion 1211, the second mounting portion 1212, and the third mounting portion 1213 monolithically, the relative locations and angles of the mounting portions can be maintained within tight tolerances, thereby reducing complexity in calibrating the camera module 1220, the first light module 1230, and the second light module 1240 once they are mounted to the mounting bracket 1210. The monolithic structure enables the image capture module 1200 to be calibrated as a separate unit. In this manner, the image capture module 1200 can be installed on a robot or other device without a further image calibration step thereby improving the initial assembly process, repair, and maintenance.

Figure 14:
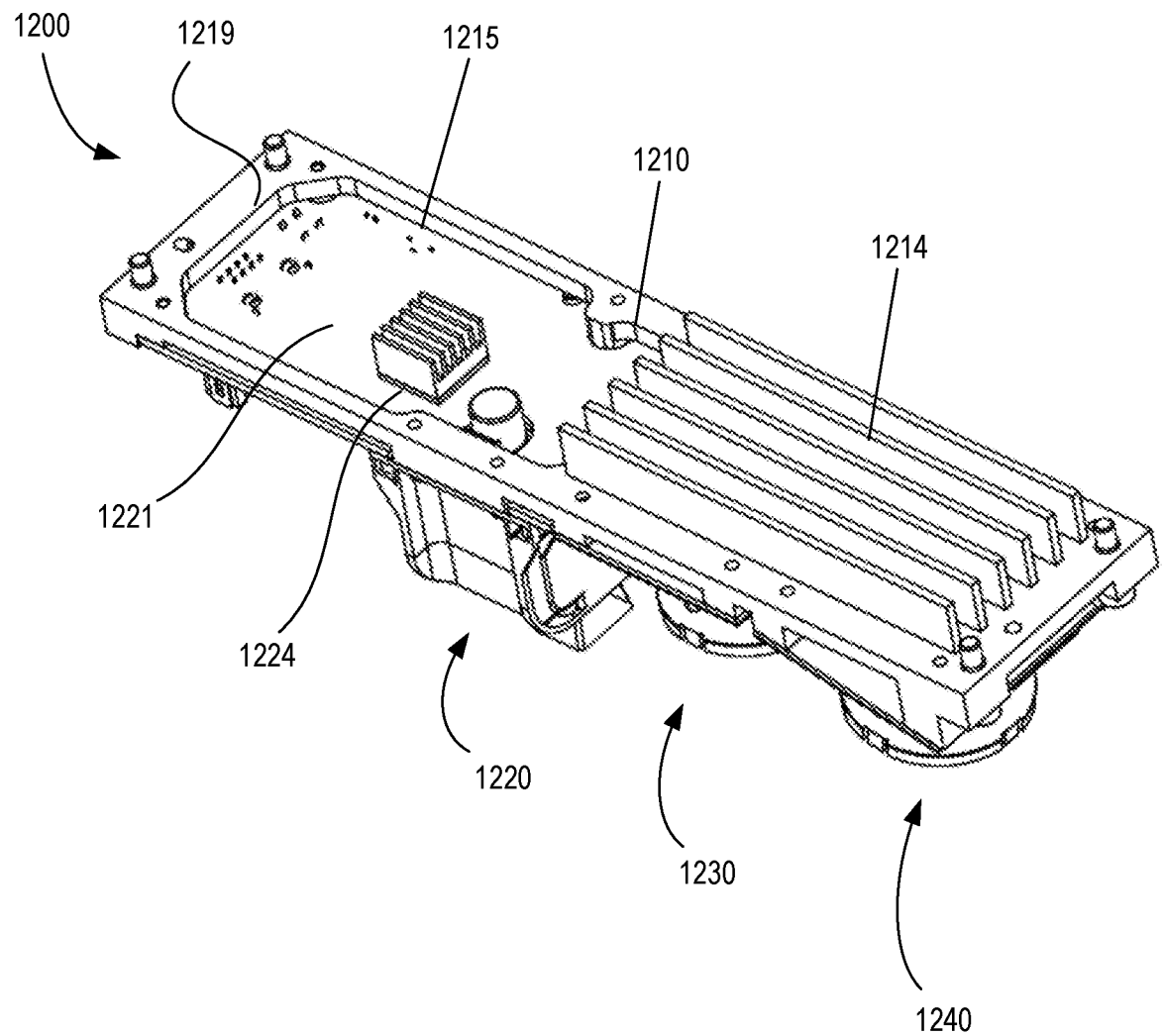
FIG. 14 is a rear perspective view of the image capture module of FIG. 12.

Additionally, as shown in FIG. 14, the mounting bracket 1210 includes heat sink fins 1214 to draw heat away from the first light module 1230 and/or the second light module 1240. To further promote heat transfer between the light modules 1230, 1240 and the mounting bracket 1210, a thermal paste or thermal pad 1216 may be disposed therebetween. Although a single heat sink is shown as being mounted to the mounting bracket 1210, it will be appreciated that multiple heat sinks and/or ducting may be applied to further promote heat dissipation from the camera module 1220, the first light module 1230 and/or the second light module 1240.

The camera module 1220 includes a control board 1221, a camera sensor 1222, and an adjustable lens 1223. The camera sensor 1222 is operable to convert light signals to an electrical signal such as a digital signal. The control board 1121 is coupled to or includes a camera heat sink 1224 for rejecting heat from the camera sensor 1222. In some embodiments, the camera heat sink 1224 extends at least partially through the cutout 1215 of the mounting bracket 1210. In some embodiments, the lens is adjustable and/or motorized to change a focus depth of the camera in under 100 milliseconds. In some embodiments, the lens is adjustable and/or motorized to change a focal length of the camera. The control board 1221 can include a system on chip (SoC), memory (e.g., DDR, NAND), and a motor driver.

The first light module 1230 can include a light element 1231 and a circuit board 1232. The second light module 1240 can include a light element 1241 and a circuit board 1242. The light elements 1231, 1241 can be a light emitting diode (LED) or any other light sources described herein, including monochromatic or near monochromatic light sources. The light elements 1231, 1241 can be a light emitting diode (LED). In some embodiments, a lens can be coupled to the light elements 1231, 1241 to focus and direct the light. The circuit boards 1232, 1242 can be a printed circuit board assembly for supplying power to the respective lighting elements 1231, 1241. In some embodiments, where LED's are employed as the light elements 1231, 1241, the circuit boards 1232, 1242 can each includes a pulse width modulation (PWM) unit, an I²C, and power line to provide granular control over the LED's duty cycle and allow for precise dimming of each LED.

In some embodiments, the circuit boards 1232, 1242 are operably coupled to the control board 1121 of the camera and power may be obtained from a battery of a robot that is supplied to the control board 1221 of the camera module 1220. Based on an operational state of the camera module 1220, a predetermined amount of power may then be supplied from the control board 1221 to the circuit board 1232 of the first light module 1230 and the circuit board 1242 of the second light module 1240 to adjust the amount of light generated by the first light module 1230 and/or the second light module 1240. Although the control board 1221 is shown as being mounted onto the mounting bracket 1210 with the camera module 1220, in some embodiments, the control board 1221 can be mounted to the frame or housing of the robot separate from the camera module 1220.

Figure 17:
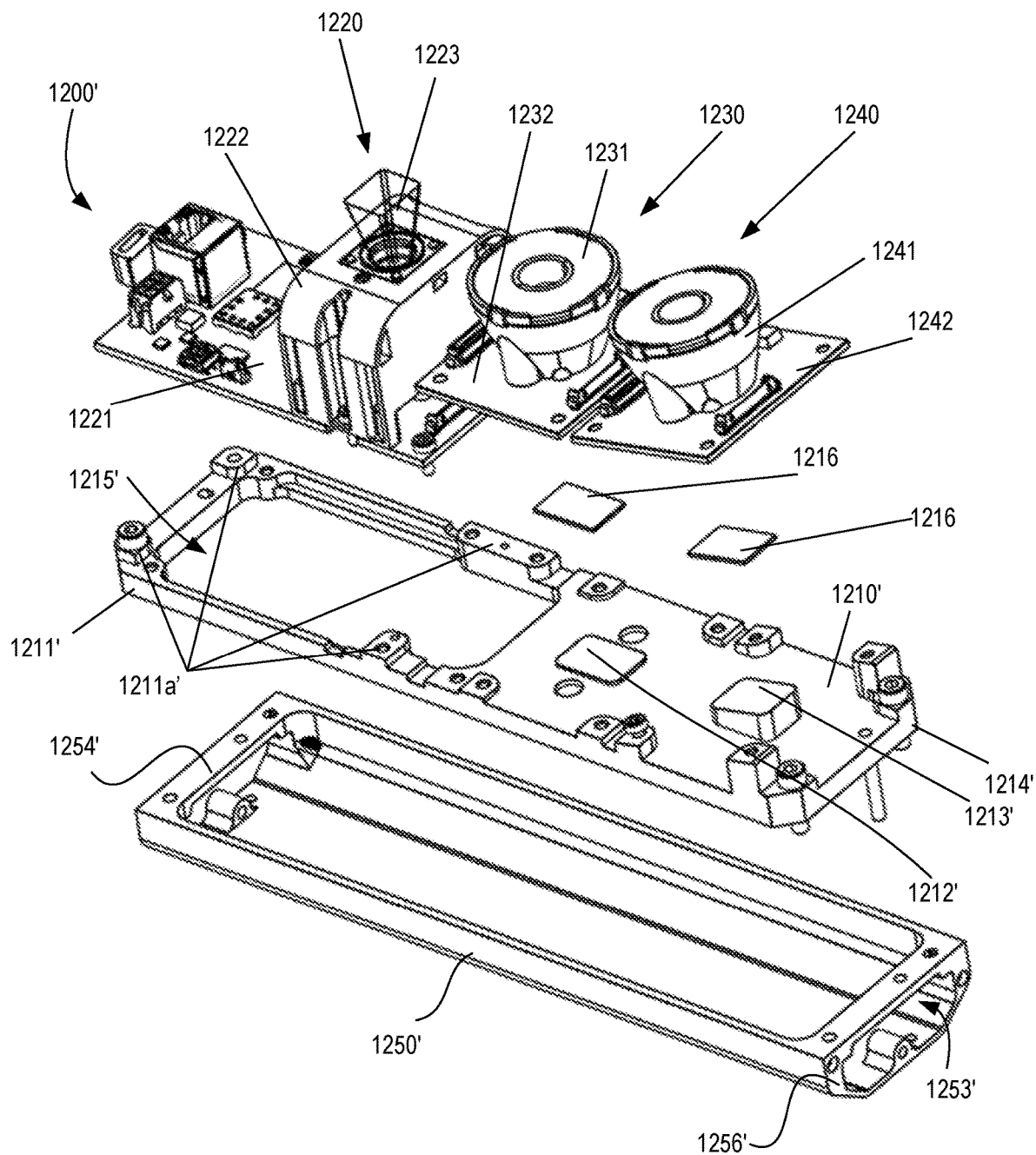
FIG. 17 is an exploded view of the image capture module of FIG. 16.
Figure 18:
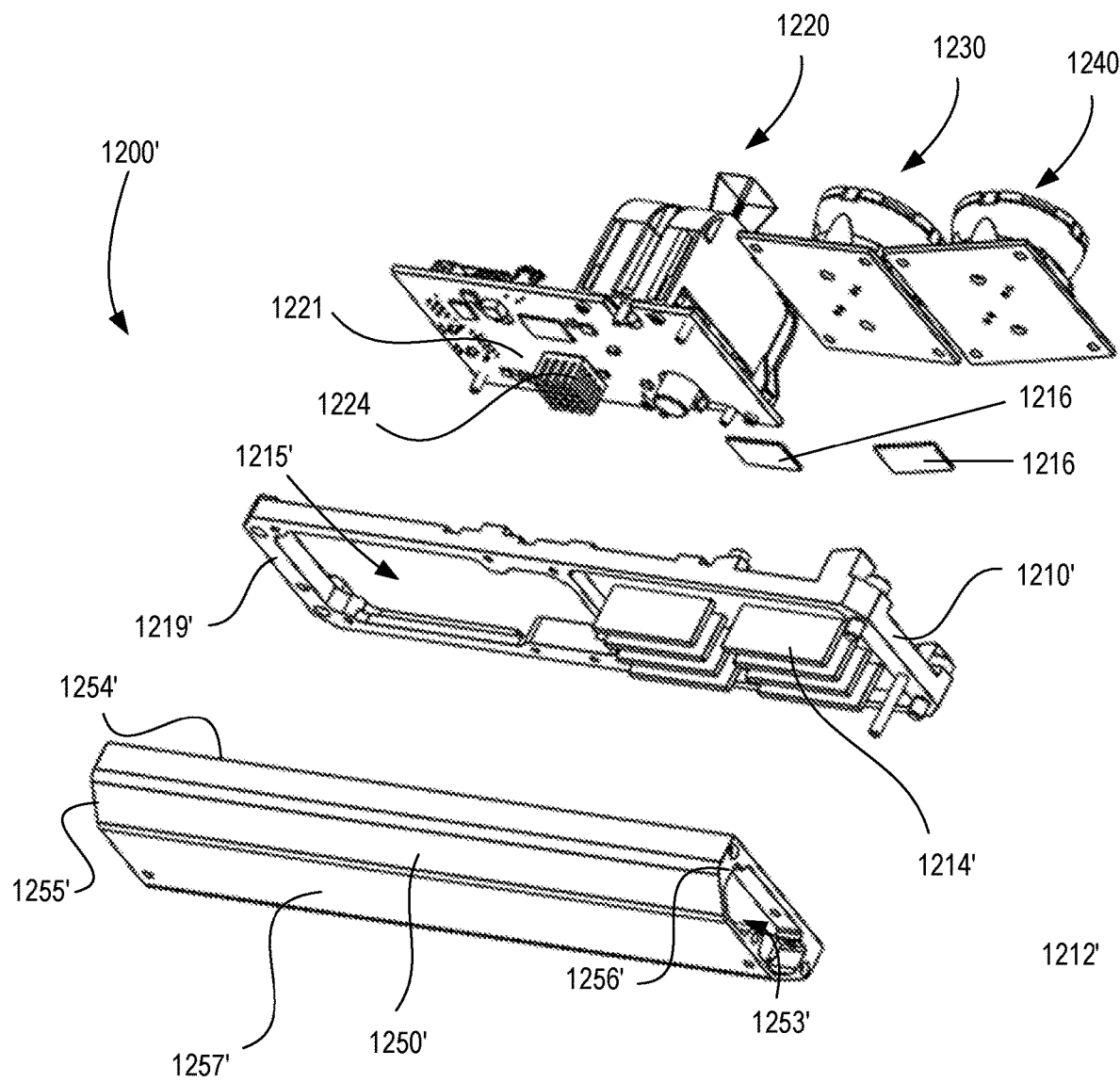
FIG. 18 is a rear exploded view of the image capture module of FIG. 16.

While FIGS. 12-15 show the image capture module 1200 as including a mounting bracket 1210 that is configured to mount to a chassis or frame of a robot, in some embodiments the image capture module 1200 can be coupled to a cooling duct or shroud member. For example, FIGS. 16-18 show an image capture module 1200' with a mounting bracket 1210' that replaces the mounting bracket 1210 of FIGS. 12-15. The corresponding components in the image capture module 1200' that are similar to those provided in the image capture module 1200 are identified by the same reference numerals.

As shown in FIG. 17, the mounting bracket 1210' includes a first mounting portion 1211', a second mounting portion 1212', and a third mounting portion 1213' on a first side of the mounting bracket 1210'. The mounting bracket 1210' further includes a fourth mounting portion 1219' on a second side of the mounting bracket 1210' opposite the first side. The first mounting portion 1211' is configured to receive and support the camera module 1220, the second mounting portion 1212' is configured to receive and support the first light module 1230, and the third mounting portion 1213' is configured to receive and support the second light module 1240. In some embodiments, the first mounting portion 1211' includes one or more mounting posts 1211a'. In some embodiments, the heat sink 1224 of the camera module 1220 extends at least partially through the cutout 1215' of the mounting bracket 1210'. The fourth mounting portion 1219' is configured to mount to a shroud member 1250'. The shroud member 1250' includes a body with a first opening 1251', a second opening 1252' and a third opening 1253'. The shroud member 1250' includes a first mounting surface 1254' surrounding the first opening 1251', a second mounting surface 1255' surrounding the second opening 1252', and a third mounting surface 1256' surrounding the third opening 1233'. The shroud member 1250' includes a fourth mounting surface 1257', opposite the first mounting surface 1254'.

As shown in FIG. 16, the fourth mounting portion 1219' of the mounting bracket 1210' is configured to be coupled to the first mounting surface 1254' of the shroud member 1250'. The mounting bracket 1210' includes heat sink fins 1214' that extend at least partially through the first opening 1251' of the shroud member 1250'. In some embodiments, the fourth mounting surface 1257' is coupled to a chassis or frame of a robot. In this manner, the image capture module 1200' may be mounted to the chassis or frame of the robot via attachment to the shroud member 1250'. Although the fourth mounting surface 1257' is shown to be on an opposite side of and parallel with the first mounting surface 1254', in some embodiments a plane defined by the fourth mounting surface 1257' and a plane defined by the first mounting surface 1254' are non-parallel and intersect each other.

In some embodiments, the second mounting surface 1255' is coupled to an inlet air manifold and the third mounting surface 1256' is coupled to an outlet air manifold. In this manner, the shroud member 1250' is configured to receive and direct cooling air across the heat sink fins 1214' to promote heat transfer and cooling of the camera module 1220, the first light module 1230 and/or the second light module 1240. In some embodiments, the air flow is reversed and the second mounting surface 1255' is coupled to an outlet air manifold and the third mounting surface 1257' is coupled to an inlet air manifold.

As generally shown in FIG. 19, the image capture module 1200 can be operated to capture the same or similar frame of image at three or more focus depths. For example, in some embodiments, the first focus depth D1 can be between 300 to 675 mm, the second focus depth D2 can be between 675 to 850 mm, and the third focus depth D3 can be between 850 to 1350 mm. To provide sufficient illumination at the different focus depths and to minimize glare for images captured at the three focus depths, the light output for the first light element 1231 and the second light element 1241 can be adjusted according to the focus depth selected for image capture. As discussed above, the camera module 1220 is operable to adjust or set the light output of the light elements 1231, 1241 via the control board 1221 by transmitting or regulating an amount of power supplied to the circuit boards 1232, 1242, respectively, thereby adjusting or setting the light intensity emitted by the light elements 1231, 1241. In some embodiments, the power output to each LED as permitted or supplied by the control board 1221 is calculated such that the luminous flux supplied on both the left and right sides are both equal to the target required. In some embodiments, the control board 1221 (or any of the modules executed by a processor of the control board 1221) can limit the power or the current to avoid damage to the light element 1231, 1241 (e.g., the maximum current supplied to the LED, which can be associated with the light elements 1231, 1241 is 1A). Table 1 below illustrates one example of the approximate light intensity at the different focus depth ranges.

TABLE 1

| Focus Depth | Outer LED Lumen | Inner LED Lumen |
| --- | --- | --- |
| 300 to 675 mm | 775 to 1000 | 25 to 100 |
| 675 to 850 mm | 500 to 775 | 100 to 400 |
| 850 to 1350 mm | 300 to 500 | 400 to 750 |

As described herein, the camera sensor 1222 of the camera module 1220 may be directed towards a shelf of products, which may contain a potential target object of interest (e.g., products, tags, price labels, shelf labels, and/or barcodes). The potential target objects of interest may be physically located at different depths from the camera module 1220. For example, a shelf label may be located on a front edge of a shelf, while a low-stock item may be located further back on the shelf. In some embodiments, the control board 1221 is configured to control the first light module 1230 (also referred to as the Inner LED) to emit a first light beam at a first light intensity during a time period when the camera module 1220 is set to capture an image at a focus depth. Stated in a different manner, when the camera module 1220 is adjusted for the camera sensor 1222 to be in focus to capture a frame of image at a predetermined focus depth, the first light module 1230 is configured to emit a light beam with a first light intensity prior to or during the camera module 1220 capturing the frame of image at the predetermined focus depth.

The control board 1221 is configured to control the second light module 1240 (also referred to as the Outer LED) to emit a second light beam at a second light intensity during the same time period when the camera module 1220 is set to capture an image at the focus depth. Stated in a different manner, when the camera module 1220 is adjusted for the camera sensor 1222 to be in focus to capture the frame of image at the predetermined focus depth, the second light module 1240 is configured to emit a light beam with a second light intensity prior to or during the camera module 1220 capturing the frame of image at the predetermined focus depth. In some embodiments, the second light intensity is greater (i.e., brighter) than the first light intensity (see, e.g., Table 1 when focus depth is set to 300 to 675 mm). In some embodiments, the first light intensity can be greater (i.e., brighter) than the second light intensity (see, e.g., Table 1 when focus depth is set to 850 to 1350 mm). In some embodiments, the control board 1221 is configured to control the first light intensity of the first light module 1230 and the second light intensity of the second light module 1240 independent of one another. In this manner, the determination and output of the first light intensity of the first light module 1230 is based on the focus depth of the camera module 1220 and does not rely on other parameters or inputs from the second light module 1240. Similarly, the determination and output of the second light intensity of the second light module 1240 is based on the focus depth of the camera module 1220 and does not rely on other parameters or inputs from the first light module 1230.

In some embodiments, the control board 1221 is configured to control the first light module 1230 to emit a first light beam at a first light intensity during a first time period when the camera module 1220 is set to capture a first image at a first focus depth. Stated in a different manner, when the camera module 1220 is adjusted for the camera sensor 1222 to be in focus to capture a first frame of image at a first focus depth, the first light module 1230 is configured to emit a light beam with a first light intensity prior to or during the camera module 1220 capturing the first frame of image at the first focus depth. The control board 1221 is configured to control the second light module 1240 to emit a second light beam at a second light intensity during the first time period when the camera module 1220 is set to capture a first image at a first focus depth. Stated in a different manner, when the camera module 1220 is adjusted for the camera sensor 1222 to be in focus to capture the first frame of image at the predetermined focus depth, the second light module 1240 is configured to emit a light beam with a second light intensity prior to or during the camera module 1220 capturing the first frame of image at the first focus depth. The second light intensity is different from the first light intensity. As shown in Table 1, in some instances the second light intensity of the Outer LED can be greater than the first light intensity of the Inner LED, and in other instances, the second light intensity can be less than the first light intensity. The control board 1221 is further configured to control the first light module 1230 to emit a third light beam at a third light intensity during a second time period when the camera module 1220 is set to capture a second image at a second focus depth. The second focus depth being longer (i.e., further away) than the first focus depth. Stated in a different manner, when the camera module 1220 is adjusted for the camera sensor 1222 to be in focus to capture a second frame of image at a second focus depth, the first light module 1230 is configured to emit a light beam with a third light intensity prior to or during the camera module 1220 capturing the second frame of image at the second focus depth. The control board 1221 is configured to control the second light module 1240 to emit a fourth light beam at a fourth light intensity during the second time period when the camera module 1220 is set to capture a second image at the second focus depth. Stated in a different manner, when the camera module 1220 is adjusted for the camera sensor 1222 to be in focus to capture the second frame of image at the predetermined focus depth, the second light module 1240 is configured to emit a light beam with a second light intensity prior to or during the camera module 1220 capturing the second frame of image at the second focus depth. The second light intensity is different from the first light intensity, the fourth light intensity is different from the second light intensity, and the fourth light intensity is different from the third light intensity. In some embodiments, the first frame of image captured at the first focus depth and the second frame of image captured at the second focus depth is the same. Stated in a different manner a left edge and a right edge of the frame of image captured at the first focus depth is positionally aligned with a left edge and a right edge of the frame of image captured at the second focus depth. In some embodiments, the first frame of image captured at the first focus depth and the second frame of image captured at the second focus depth is positionally offset along at least the x-axis.

Figure 20:
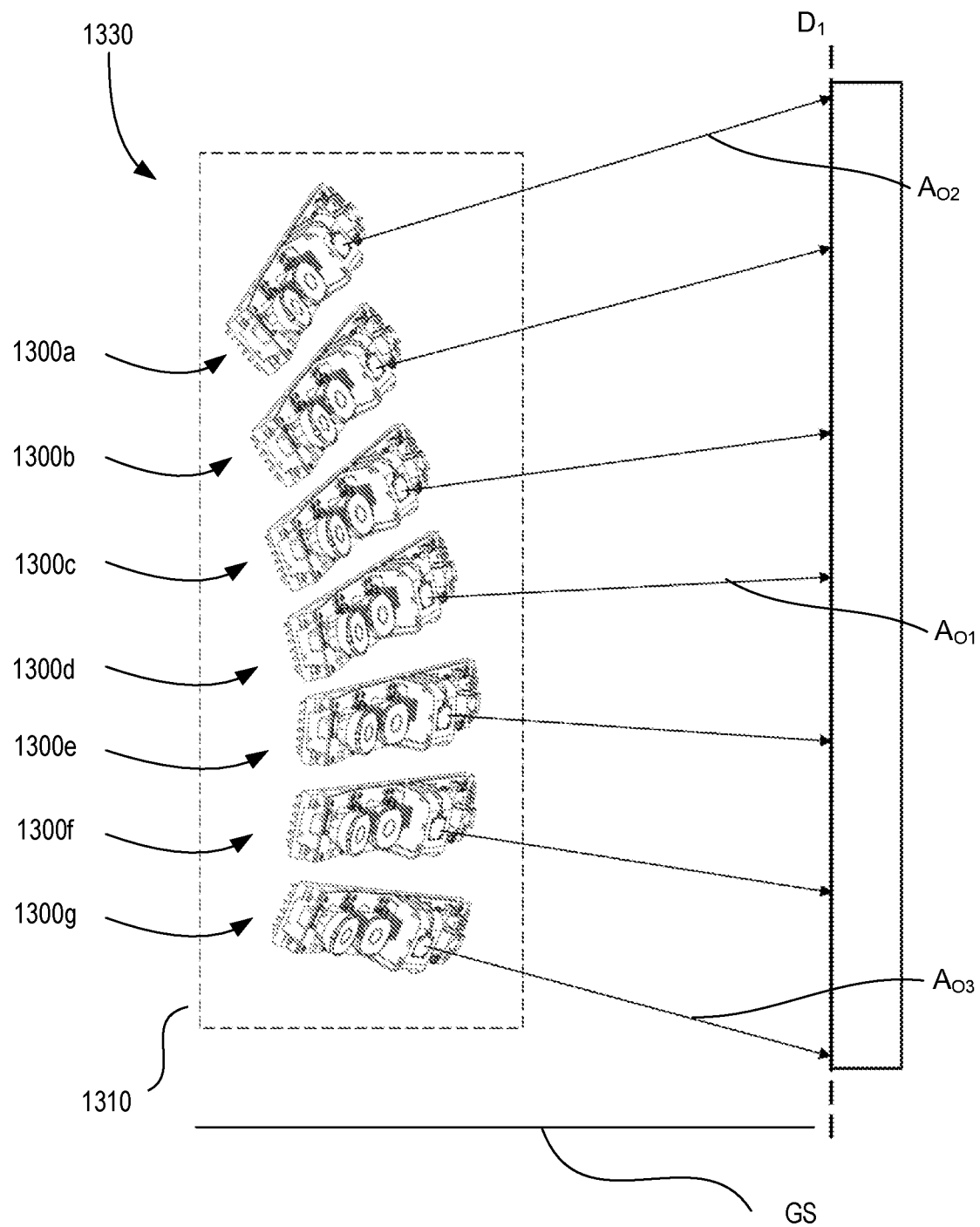
FIG. 20 is a perspective view of a system including a vertical arrangement including a plurality of image capture modules.

Although FIG. 19 shows the camera module 1220 (and the mounting bracket 1210) being rotated θ degrees around the z-axis relative to a frontal area of interest, such as a shelf containing products and barcodes. In some embodiments, the camera module 1220 can be rotated between about −30 to 30 degrees around the z-axis relative to the frontal area of interest. Additionally, the first light module 1230 is shown in FIG. 19 as being rotated θ+α degrees around the z-axis relative to the frontal area of interest, and as described herein, α can be about 0.5 to 5 degrees. Furthermore, the second light module 1240 is shown in FIG. 19 as being rotated θ+β degrees around the z-axis relative to the frontal area of interest, and as described herein, β can be about 3 to 20 degrees. One or more image capture module 1200 can be used together with or used in the place of any of the other cameras described herein, such as for example, the cameras for the inventory monitoring camera system 100, the autonomous robot 500, the camera platform 600, the movably mounted camera system 700, camera 810, the and camera 902. For example, as shown in FIG. 20, a system 1300 plurality of image capture module 1300a-1300g can be mounted to a chassis 1310 of a movable platform or robot as described herein, and the image capture modules 1300a-1300g can include any or all of the features shown and described for the image capture module 1200. For example, the chassis 1310 can be mounted to and supported by a movable base (not shown) and the movable base is configured to move along a ground surface (GS) such as the floor of a store. To limit an overall height of the movable platform or robot such that it can pass through doorways, avoid other overhead obstacles, or to maintain a compact overall design, one or more image capture modules may be positioned lower than a potential target object of interest (e.g., the image capture module may be physically located at a level lower than the target object of interest along the z-axis in FIG. 20, the naming of the z-axis being arbitrary). To compensate for any potential lack of alignment along the z-axis, the image capture module 1300a may be angled upward relative to the y-axis in FIG. 20, the naming of the y-axis being arbitrary. In some embodiment, the upward angle of the image capture module 1300a can be between 5 and 75 degrees. Similarly, to provide clearance for drivetrain components of the movable platform or robot, or to provide clearance for obstacles on the ground, one or more image capture modules may be positioned higher than a potential target object of interest. To compensate for any potential lack of alignment along the z-axis, the image capture module 1300g may be angled downward relative to the y-axis in FIG. 20. In some embodiment, the downward angle of the image capture module 1300g can be between 5 and 75 degrees.

As generally shown in FIG. 20, image capture module 1300e is oriented such that a plane of the mounting portion for the camera module in the image capture module 1300e is perpendicular with a plane of the ground surface (i.e., plane extending along the x- and y-axes) on which the robot moves on. In this manner, an optical axis ($A_{O1}$) of the camera module for the image capture module 1300e is parallel with the plane of the ground surface. Stated in a different manner, the optical axis ($A_{O1}$) of the first camera module 1300e and the surface plane defines a tilt angle of about 0 degrees. In some embodiments, the optical axis ($A_{O1}$) of the first camera module 1300e and the surface plane defines a non-zero degree tilt angle. By comparison, image capture module 1300a is oriented at an angle upward. Thus, the plane of the mounting portion for the camera module in the image capture module 1300a is non-perpendicular with the plane of the ground surface. In this manner, the optical axis ($A_{O2}$) of the camera module for the image capture module 1300a is non-parallel with the plane of the ground surface. In some embodiments, the optical axis of the camera module for the image capture module 1300a is angled upward between about 5 and 75 degrees relative to the surface plane of the ground surface. Stated in a different manner, the optical axis ($A_{O2}$) of the second camera module 1300a and the surface plane define a tilt angle, and the optical axis ($A_{O2}$) is pointed upwards toward a potential target object. In some embodiments, the optical axis of the camera module and the plane of the ground surfaces define a negative tilt angle of about −5 and −75 degrees. For example, the plane of the mounting portion for the camera module in the image capture module 1300g is non-perpendicular with the plane of the ground surface and is angled downward. Stated in a different manner, the optical axis ($A_{O3}$) of the third camera module 1300g and the surface plane defines a downward tilt angle.

Figure 21:
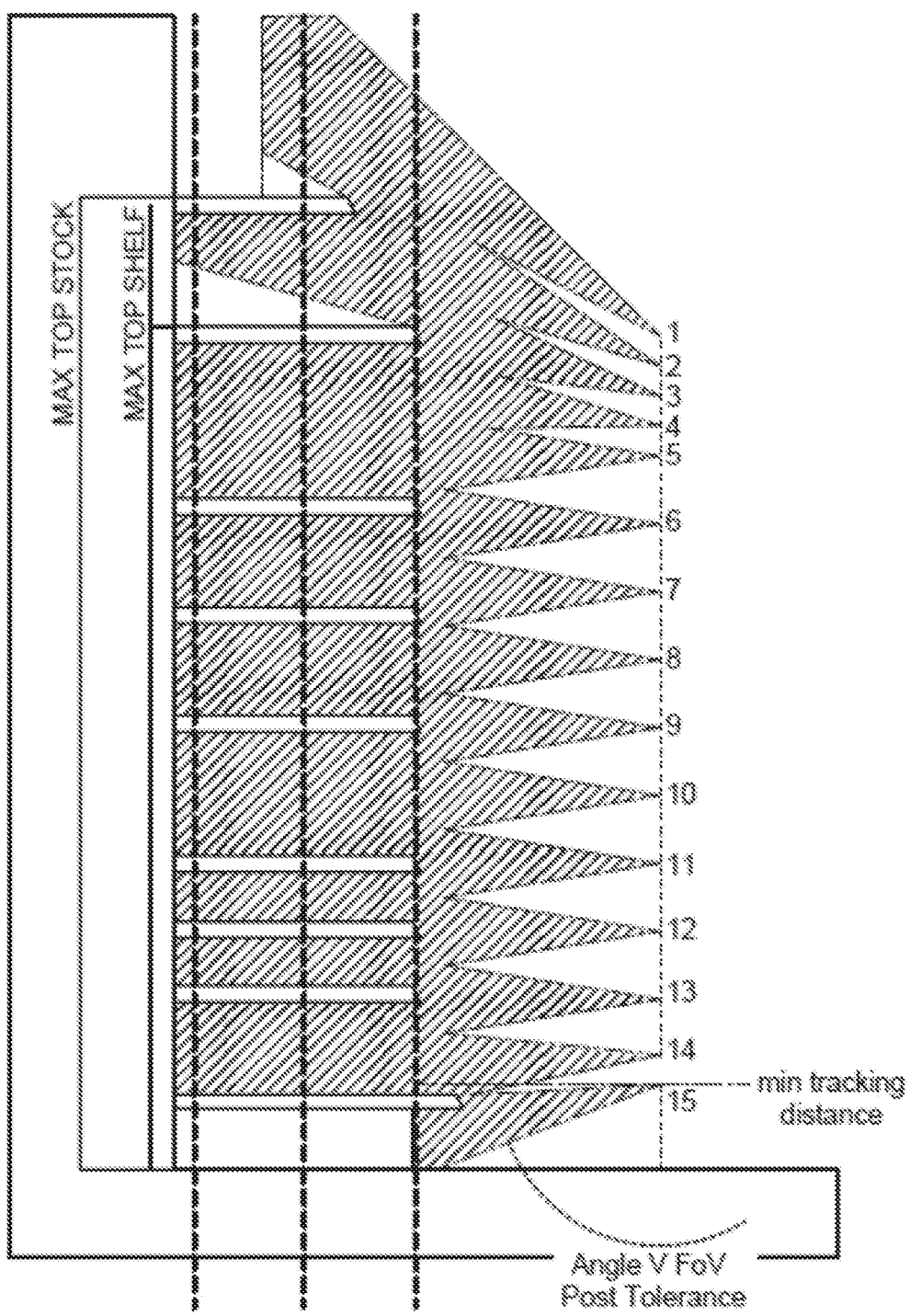
FIG. 21 is a schematic illustration depicting a system including fifteen image capture modules.

As generally shown in FIGS. 20 and 21, the distance to a first focus depth D1 for the angled image capture modules (e.g., 1300a, 1300g) is increased when compared to the distance to the first focus depth for the image capture modules (e.g., 1300d, 1300e) that are aimed horizontally relative to the y-axis. Accordingly, to ensure consistent illumination of potential target objects of interest regardless of their location along the z-axis (i.e., their shelf position), the light intensity of light elements (e.g., light elements 1231 and/or 1241) associated with a corresponding tilted image capture modules (e.g., 1300a, 1300g) may be increased relative to those aimed horizontally.

FIG. 21 is a schematic illustration depicting a system including fifteen image capture modules and Table 2 below illustrates the approximate light intensity for each of the fifteen image capture modules listed as 1 to 15 from top to bottom. Although fifteen image capture modules are depicted in this example, any suitable number of image capture modules can be used. For example, in some embodiments, use of 12 to 18 image capture modules are contemplated for shelf scanning applications.

TABLE 2

| Image Capture Module | Outer LED Lumen |
| --- | --- |
| 1 | 800-1500 |
| 2 | 750-1200 |
| 3 | 700-1100 |
| 4 | 650-1050 |
| 5 | 650-1050 |
| 6 | 600-1000 |
| 7 | 600-1000 |
| 8 | 600-1000 |
| 9 | 600-1000 |
| 10 | 600-1000 |
| 11 | 650-1050 |
| 12 | 650-1050 |
| 13 | 700-1100 |
| 14 | 750-1200 |
| 15 | 800-1500 |

Although the image capture modules 1200 and 1300a-1300g are illustrated and described as being aimed horizontally relative to the y-axis towards the shelf or other target objects while the robot or movable platform is traveling along the x-axis (e.g., FIGS. 19-21), in some embodiments, the robot or movable platform can be provided with a mirror assembly and the image capture modules 1200 and 1300a-1300g can be mounted and aimed in a direction along the x-axis towards the mirror assembly in order to capture images of targets of interest found along the y-axis. In some embodiments, the mirror assembly can include one or more mirrors and can be mounted at a fixed angle relative to the mirror assembly (e.g., 30-60 degrees). In some embodiments, the mirrors are configured to rotate about a z-axis and/or to actuate along the x-axis to move closer to or away from the image capture modules 1200 and 1300a-1300g. The mirror assembly enables the image capture modules to be positioned within the robot or movable platform assembly to enable smaller packaging, permit scanning of both sides of the aisles either simultaneously or successively without having to turn the robot around.

Figure 22A:
FIGS. 22A and 22B depict sample photographic images captured by an image capture module at different focus depths.
Figure 22B:
Figure 23A:
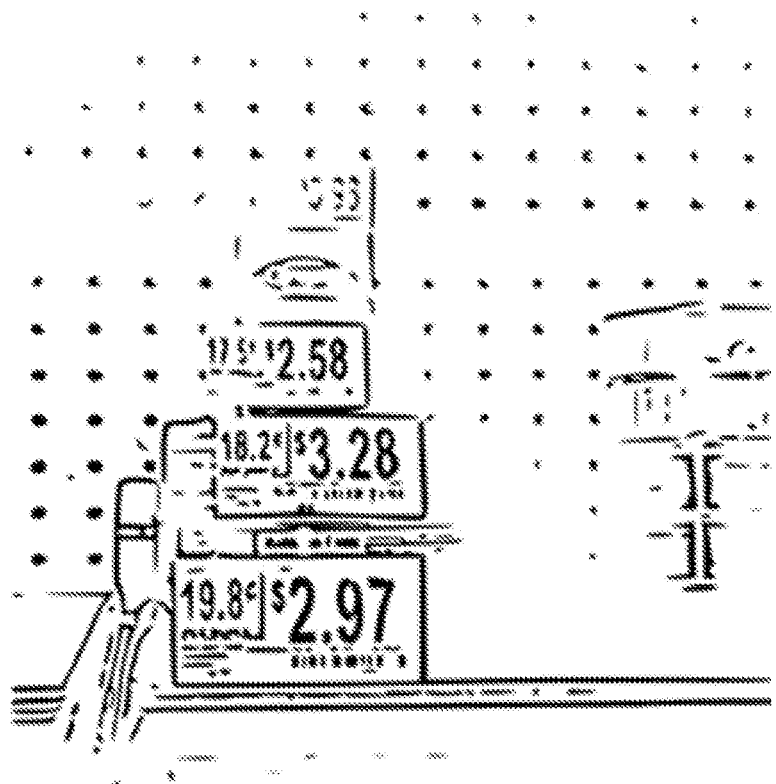
FIGS. 23A and 23B depict converted sample images based on the photographs in FIGS. 22A and 22B.
Figure 23B:
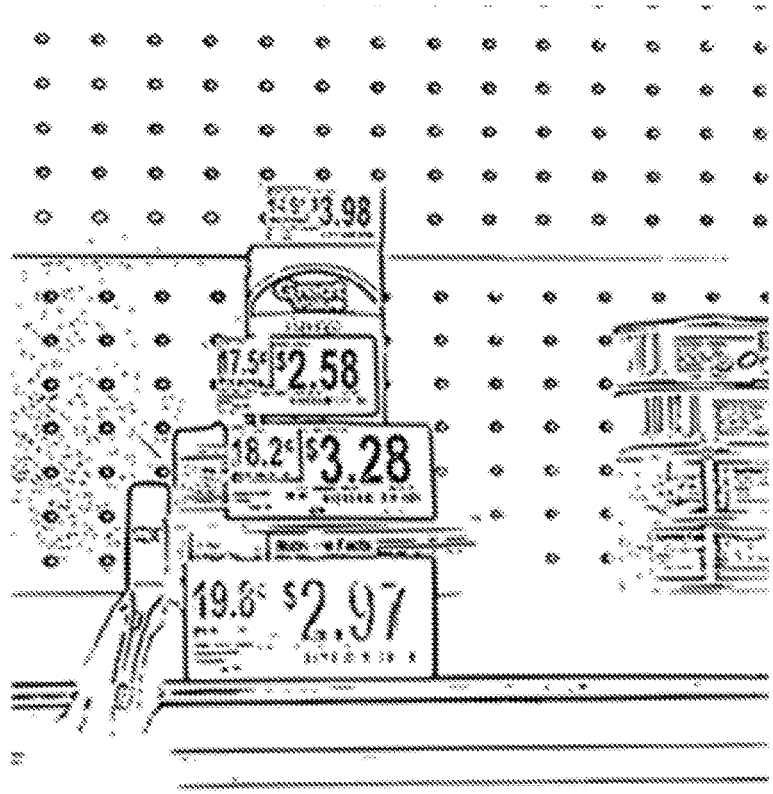

FIGS. 22A and 23A show sample images captured at a first focus depth D1 with a first light setting. FIGS. 22B and 23B show sample images captured at a second focus depth D2 with a second light setting. The images captured at the different focus depths can be stored in memory and processed as described herein. In some embodiments, once images of the same or similar frame are captured at different focus depths, the images can be analyzed to determine whether there are any target objects of interest (e.g., products, tags, price labels, shelf labels, and/or barcodes). If a target object of interest is detected, the best image out of the different focus depths is selected and the remaining images may be discarded to reduce memory/storage consumption, reduce the volume of images that undergo further computation processing (e.g., being stitched into a panoramic image or have optical recognition performed to read barcodes), or reduce the volume of data to be transmitted out of the image capture modules and/or the robot. In some embodiments, images of the same or similar frame at two or more focus depths can be combined or merged together where objects of interest are observed at the two or more focus depths. For example, if a first object of interest is observed in an upper-left quadrant of the image taken at a first focus depth and a second object of interest is observed in a lower-right quadrant of the image taken at a second focus depth, the upper-left quadrant of the image taken at the first focus depth and the lower-right quadrant of the image taken at the second focus depth can each be selected and merged or stitched together such that both the first object and second object are in focus and with the appropriate lighting.

In some embodiment, high-resolution images can be captured by the image sensors of the camera (such as by the camera module 1220) to provide a high level of detail for determining whether an object of interest is present and/or if the image has appropriate focus, exposure, lighting, etc. The camera may have on-board processing to then convert any high-resolution images of interest that have been captured to lower resolution format for further processing by an on-board computer of a robot or system described herein, or for further processing on systems off-site. By converting images of interest to a lower resolution format, less data transfer traffic and lower power consumption can be achieved. In some embodiments, some high-resolution data from a portion of an image can be retained while the remaining portion of the image can be converted to lower resolution. For example, if the image contains a box of cereal and a label with barcode information, the cover art on the box of cereal may be of less importance and can be converted to a lower resolution, whereas the barcode information can be retained at the high-resolution format.

In some embodiments, the unused images or portions of images can be discarded to prevent further resources (e.g., memory, storage, CPU cycles, power) from being dedicated to the unused images or images of less interest. For example, if images of the same or similar frame are captured at three different focus depths, one-third of those images can be discarded after the image or portions of the image of interest has been identified and saved. In some embodiments, a panoramic stitching process can be performed after images of less interest are discarded.

As will be understood, the camera system and methods described herein can operate locally or in via connections to either a wired or wireless connected subsystem for interaction with devices such as servers, desktop computers, laptops, tablets, or smart phones. Data and control signals can be received, generated, or transported between varieties of external data sources, including wireless networks, personal area networks, cellular networks, the Internet, or cloud mediated data sources. In addition, sources of local data (e.g., a hard drive, solid state drive, flash memory, or any other suitable memory, including dynamic memory, such as SRAM or DRAM) can allow for local data storage of user-specified preferences or protocols. In some embodiment, multiple communication systems can be provided. For example, a direct Wi-Fi connection (802.11b/g/n) can be used as well as a separate 4G cellular connection.

Connection to remote server embodiments may also be implemented in cloud computing environments. Cloud computing may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

According to some embodiments, both cameras and lights can be movably mounted. For example, hinged, rail, electromagnetic piston, or other suitable actuating mechanisms used to programmatically rotate, elevate, depress, oscillate, or laterally or vertically reposition cameras or lights. In some embodiments, movable or fixedly mounted cameras can be mounted on an autonomous robot having a navigation and object sensing suite that is capable of independently navigating and moving throughout a building. The autonomous robot can have multiple cameras attached to a movable base by a vertically extending camera support. Lights can be positioned to direct light toward the shelf or another target. The object sensing suite of the autonomous robot can include forward, side, top and/or rear image and depth sensors to aid in navigation or object (e.g., shelf) detection and localization. Additional sensors such as laser ranging systems can also form a part of the sensor suite that is useful for accurate distance determination for the autonomous robot. In some embodiments, image sensors can be depth sensors that infer depth from stereo images, project an infrared mesh overlay that allows rough determination of object distance in an image, or that infer depth from the time of flight of light reflecting off the target. In other embodiments, simple cameras and various image processing algorithms for identifying object position and location can be used. For selected applications, ultrasonic sensors, radar systems, magnetometers or the like can be used to aid in navigation. In still other embodiments, sensors capable of detecting electromagnetic, light, or other location beacons can be useful for precise positioning of the autonomous robot.

Image sensor 103 captures images under control of processor 101 from light from the environment entering camera 100. The camera is capable of capturing the images from the environment. Sensor 103 may provide a color image or a gray-scale image. In some embodiments, conventional RGB CMOS or CCD sensors can be used, alone or in combination with spectral filters that may include narrowband, wideband, or polarization filters. Embodiments can also include sensors capable of detecting infrared, ultraviolet, or other wavelengths to allow for hyperspectral image processing. This can allow, for example, monitoring and tracking of markers, labels or guides that are not visible to people, or using flashing light in the invisible spectrum to reduce energy consumption and motion blur.

Communication interfaces 104 typically include one or more communication interfaces (e.g., a network interface, a USB interface) which allows image data to be transferred from storage 106 to a communicating external device (e.g., a computer). Storage 106 provides non-volatile storage (e.g., archived images and software). Memory 102 provides runtime memory support for processor 101, such as frame buffers for image processing operations In some embodiments, memory 102 may be allocated to include multiple memory spaces such as a manufacturer's memory space, a developer's memory space, and a user memory space. The manufacturer's memory space may be provided with system software provided by the camera manufacturers, such as firmware for operating camera system 100. The user memory space may be used, for example, for allocating frame buffers for image processing. Frame buffers are typically allocated for holding image data captured by image sensor 103. Such image data may include, for example, frame buffers holding consecutive frames of images. The developer's memory space may be used, for example, for holding software modules executed by processor 101 for carrying out a system or a method of image processing.

In some embodiments, any of the cameras or image capture modules described herein can be mounted to a fixed location to capture images of objects passing by (e.g., a conveyer belt, a loading dock, a garage, etc.). Alternatively, any of the cameras or image capture modules described herein can be mounted on a robot or movable platform. The robot or movable platform can be navigated via remote control or can be completely autonomous. The cameras, image capture modules, robot, and/or movable platform can be supported by artificial intelligent computing power, either on-board or from a remote location. Information and data can be processed on-board the robot, on-site at a location where the robot is present using a separate computer, and/or off-site at a location remote from where the robot is present using a remote server, such as a data server. In some embodiments, the robot is an autonomous robot that is configured to survey a premise's construction features, fixtures within the premises, and objects on or within the fixtures. Deep analysis of the survey information and data can be performed to map the premises, detect changes in locations of fixtures, detect changes to objects on or within the fixtures (e.g., out of stock detection of products, planogram compliance, damage, spoilage, and gaps or inefficient use of space on fixtures). Survey information and data can be obtained for any premises including retail stores, libraries, museums, gardens, parking lots, factories, depots, and data centers, and the information and data can include 2D and 3D map of such premises.

In some embodiments, any of the systems described herein are operable to capture information (e.g., 3D structures and other objects displayed or presented within the structure of the image) via any of the cameras, image capture modules, and/or sensors described above. Any of the systems described herein can also detect and process non-visual signals in any premises to generate a 2D and/or 3D map of such premises. For example, the non-visual signals can include radio signals, Wi-Fi signals, or any other traceable wireless signals. In some embodiments, both visual and non-visual signals are captured and data obtained from both types of signals can be fused together to generate 2D and/or 3D maps of the observed premises. In some embodiment, a system can have a detectable emission to generate 2D and/or 3D maps of the observed premises. For example, the system may emit a radar, a visible light, a non-visible light (e.g., infrared light beyond visual spectrum at 700-850 nm or greater), or a combination thereof to learn about the surrounding environment and any potential obstacles. The 2D and/or 3D map information may include measurements of features and objects of interest (e.g., height, width, depth of aisle, doorways, obstacles, or other objects of interest) and location information (e.g., GPS, waypoint, landmark, or other location identifying information). In some embodiments, the 2D and/or 3D map includes 3D point clouds that can be used alone, or can be augmented with RGB images through colorization of point clouds, photogrammetry, stitching, or other special projection techniques.

In some embodiments, any of the robots or movable platforms described herein can include emitters and transceivers to introduce a change into the surrounding environment. For example, the robot or movable platform could come into proximity with an electronic device, such as an electronic shelf label (ESL) or smart shelf. The robot or movable platform can charge these electronic devices inductively or via RFID, collect data wirelessly from these electronic devices, and/or transmit a signal to cause the electronic devices to change an operating state (e.g., change a price stored or displayed on the ESL). In some embodiments, any of the robots or movable platforms described herein can serve as a theft deterrent by prominently featuring a camera, display a video recorded by the camera on a screen mounted on the robot or movable platform, emit sounds and/or lights to deter certain behavior, and/or conduct regular patrols around the premises.

In some embodiments, any of the robots or movable platforms described herein can act as a security guard by patrolling the premises and providing video feedback to a human operator or other security monitoring system (either on-site or off-site). The robots or movable platforms can further include systems for automatically analyzing captured data to deter people, alert security personnel, emit sounds and/or lights to deter certain behavior, and/or an operating behavior of the robot or movable platform in order to deter intruder or undesired behavior.

In some embodiments, any of the robots or movable platforms described herein can serve an advertising function by displaying static marketing materials on an exterior of the robot or the movable platform, displaying static or dynamic marketing materials on a screen mounted to the robot or movable platform, and/or audibly providing information via speakers to surrounding patrons. The robot or movable platform can be configured to audibly respond to a patron's request (e.g., provide directions to an item or location), to scan a barcode of an item to provide information relating to the item, or to identify an item held by the patron to provide product information relating to the item.

In some embodiments, any of the robots or movable platforms can include a recharging and launch pad for a tethered or untethered auxiliary system, such as an unmanned aerial vehicle (UAV) or drone. The UAV or drone can be configured to fly around the premises to scan, capture images, and survey higher shelves, structures or other inventory inaccessible to the robot or movable platform. The UAV or drone may work in concert with the robot or the movable platform to capture images, collect data, transmit data, and/or receive data from other sources. The UAV or drone can dock with the robot or movable platform for charging, or can be tethered to the robot or movable platform via a cable. The robot, movable platform, UAV, and/or drone can be operable to manipulate surrounding objects, such as pushing or moving an empty box.

In some embodiments, any of the robots or movable platforms can include obstacle avoidance systems. The obstacle avoidance systems can include one or more of a LIDAR mounted to front/side/back, cameras mounted front/back/sides at both low and high positions, angled time-of-flight (TOF) cameras to survey high and low levels while pointed downward, 360-degree camera (which may include 4 or more wide field cameras), and cameras attached to or mounted to shelves or other stationary items on the premises and configured to relay captured images to the robot or movable platform. The TOF camera, LIDAR, and other cameras can work in unison to obtain data for generation of a COST map and to assist the robot or movable platform in navigating through a clear path. In some embodiments, the LIDAR may be positioned on the front and/or sides of the robot or movable platform to detect objects on the ground and may be elevated 20-30 cm above the ground. In some embodiments, the 360-degree camera is mounted to the top of the robot or movable platform to provide a complete surround view from the top of the robot or movable platform to the floor.

In some embodiments, any of the robots or movable platforms described herein can be configured to locate inventory tagged with labels, barcodes, or other indicia via one or more of the cameras, image capture modules, and/or sensors described herein. For example, the robots or movable platforms can be adapted to move throughout a retail store, warehouse, depot, storage facility, etc., to locate inventory via the labels, barcodes, or other indicia.

Many modifications and other embodiments will come to the mind of one skilled in the art. Therefore, although various embodiments of the invention have been described above, it should be understood that they have been presented by way of example only, and not limitation. It is also understood that other embodiments of this invention may be practiced in the absence of an element/step not specifically disclosed herein. Where methods described above indicate certain events occurring in certain order, the ordering of certain events may be modified. Additionally, certain of the events may be performed concurrently in a parallel process when possible, as well as performed sequentially as described above.

For example, although the systems and methods are described herein as being generally applicable to managing and/or mapping inventory or contents of stores or warehouses, any of the devices, systems, and methods described herein can be used to fixedly mounted cameras 630 (and any of the camera systems described herein) can be used for navigating hallways, paths, roads, and other surfaces for capturing images of other environments, including but not limited to, libraries, archives, storage containers, wine cellars, museums, gardens, parking lots, factories, depots, and data centers.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

Although various embodiments have been described as having particular features and/or combinations of components, other embodiments are possible having a combination of any features and/or components from any of embodiments as discussed above. Aspects have been described in the general context of robots, and more specifically inventory tracking robots, but inventive aspects are not necessarily limited to use in robots.

What is claimed is:

1. An apparatus, comprising:
   a mounting bracket including a first mounting portion, a second mounting portion and a third mounting portion, the first mounting portion defining a first plane;
   a camera module including a control board, the camera module secured to the first mounting portion;
   a first light module secured to the second mounting portion; and
   a second light module secured to the third mounting portion;
   wherein:
   the second mounting portion defines a second plane, the second plane and the first plane intersecting to define a first angle;
   the third mounting portion defining a third plane, the third plane and the first plane intersecting to define a second angle;
   the second angle is greater than the first angle;
   the control board is configured to control the first light module to emit a first light beam at a first light intensity during a first time period when the camera module is set to capture a first image at a first focus depth;
   the control board is configured to control the second light module to emit a second light beam at a second light intensity during the first time period;
   the control board is configured to control the first light module to emit a third light beam at a third light intensity during a second time period when the camera module is set to capture a second image at a second focus depth, the second focus depth being different than the first focus depth;
   the control board is configured to control the second light module to emit a fourth light beam at a fourth light intensity during the second time period;
   the second light intensity is greater than the first light intensity; and
   the fourth light intensity is less than the third light intensity.

2. The apparatus of claim 1, wherein the first angle is between 0.5 and 5 degrees.

3. The apparatus of claim 1, wherein the first angle is between 1 and 1.5 degrees.

4. The apparatus of claim 1, wherein the second angle is between 3 and 20 degrees.

5. The apparatus of claim 1, wherein the second angle is between 8 and 12 degrees.

6. The apparatus of claim 1, wherein a center of the camera module is spaced approximately 25 to 150 mm from a center of the first light module along the first plane.

7. The apparatus of claim 1, wherein a center of the first light module is spaced approximately 25 to 150 mm from a center of the second light module along the first plane.

8. The apparatus of claim 1, wherein:
the second light intensity is independent from the first light intensity.

9. An image capture system, comprising:
a movable base configured to move on a surface;
a chassis supported by the movable base;
a first image capture module including a first mounting bracket, a first camera module, a first light module, and a second light module, the first mounting bracket being mounted to the chassis; and
a second image capture module, the second image capture module including a second mounting bracket, a second camera module, a third light module, and a fourth light module; wherein:
the first mounting bracket includes a first mounting portion, a second mounting portion and a third mounting portion;
the first camera module is secured to the first mounting portion;
the first light module is secured to the second mounting portion;
the second light module is secured to the third mounting portion;
the first mounting portion defines a first plane;
the second mounting portion defines a second plane, the second plane and the first plane intersecting to define a first angle;
the third mounting portion defining a third plane, the third plane and the first plane intersecting to define a second angle;
the second angle is greater than the first angle;
the first image capture module is mounted to the chassis at a first height relative to the surface; and
the second image capture module is mounted to the chassis at a second height relative to the surface, the second height being different from the first height.

10. The image capture system of claim 9, wherein:
the surface defines a surface plane; and
the first plane of the first mounting bracket is perpendicular with the surface plane.

11. The image capture system of claim 9, wherein:
the surface defines a surface plane; and
the surface plane and an optical axis of the first camera module define a tilt angle of between 5 and 75 degrees.

12. The image capture system of claim 9, wherein:
the first camera module includes a control board;
the control board is configured to control the first light module to emit a first light beam at a first light intensity during a time period;
the control board is configured to control the second light module to emit a second light beam at a second light intensity during the time period; and
the second light intensity is independent from the first light intensity.

13. The image capture system of claim 9, wherein:
the second mounting bracket includes a fourth mounting portion, a fifth mounting portion and a sixth mounting portion;
the second camera module is secured to the fourth mounting portion;
the third light module is secured to the fifth mounting portion;
the fourth light module is secured to the sixth mounting portion;
the fourth mounting portion defines a fourth plane;
the fifth mounting portion defines a fifth plane, the fifth plane and the fourth plane intersecting to define a third angle;
the sixth mounting portion defining a sixth plane, the sixth plane and the fourth plane intersecting to define a fourth angle; and
the fourth angle is greater than the third angle.

14. The image capture system of claim 13, wherein:
the surface defines a surface plane;
the first plane of the first mounting bracket is perpendicular with the surface plane; and
the fourth plane of the second mounting bracket is non-perpendicular with the surface plane.

15. The image capture system of claim 9, wherein:
the surface defines a surface plane;
a first optical axis of the first camera module and the surface plane define a tilt angle of 0 degrees; and
a second optical axis of the second camera module and the surface plane define a second tilt angle between 5 and 75 degrees.

16. A method of adjusting light intensity in an image capture system, the image capture system including a mounting bracket, a camera module, a first light module, and a second light module, the method comprising:
adjusting a camera of the camera module to a focus depth, the camera module being mounted to a first mounting portion of the mounting bracket, the first mounting portion defining a first plane;
setting a first intensity level of the first light module to emit a first light beam at a first light intensity during a time period when the camera is set to capture an image at the focus depth, the first light module being mounted to a second mounting portion of the mounting bracket, the second mounting portion defining a second plane, and the second plane intersecting with the first plane to define a first angle;
setting a second intensity level of the second light module to emit a second light beam at a second light intensity during the time period when the camera is set to capture the image at the focus depth, the second light module being mounted to a third mounting portion of the mounting bracket, the third mounting portion defining a third plane, and the third plane intersecting with the first plane to define a second angle;
the second light intensity is independent from the first light intensity; and
the second angle is greater than the first angle.

17. The method of claim 16, wherein:
the focus depth is a first focus depth, the image is a first image, and the time period is a first time period;
the method further comprises:
adjusting the camera of the camera module to a second focus depth;
setting a third intensity level of the first light module to emit a third light beam at a third light intensity during a second time period when the camera is set to capture a second image at the second focus depth,
setting a fourth intensity level of the second light module to emit a fourth light beam at a fourth light intensity during the second time period,
the second focus depth is longer than the first focus depth;
the fourth light intensity is less than the second light intensity; and
the fourth light intensity is less than the third light intensity.

18. A method of capturing an image of a target object using an image capture system, the image capture system including a camera module, a first light module, and a second light module, the method comprising:
- determining a focal distance of the target object;
- sending a first signal to the first light module to emit a first light beam at least a first portion of the target object at a first light intensity, the first light intensity associated with the focal distance;
- sending a second signal to the second light module to emit a second light beam at least a second portion of the target object at a second light intensity, the second light intensity being independent from the first light intensity, the second light intensity associated with the focal distance;
- capturing, via the camera module, the image of the target object during a time period when the target object is illuminated by the first light module and the second light module.

19. The method of claim 18, wherein the first portion of the target object overlaps with the second portion of the target object.

20. The method of claim 18, wherein the camera module, the first light module, and the second light module are each coupled to a mounting bracket.

* * * * *